United States Patent
Samal et al.

(10) Patent No.: US 12,230,261 B2
(45) Date of Patent: Feb. 18, 2025

(54) ELECTRONIC APPARATUS AND METHOD FOR CONTROLLING USER INTERFACE ELEMENTS BY VOICE

(71) Applicant: Samsung Electronics Co., Ltd., Suwon-si (KR)

(72) Inventors: Ranjan Kumar Samal, Bengaluru (IN); Praveen Kumar Guvvakallu Sivamoorthy, Bengaluru (IN); Purushothama Chowdari Gonuguntla, Bengaluru (IN); Rituraj Laxminarayan Kabra, Bengaluru (IN); Manjunath Belgod Lokanath, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 17/452,510

(22) Filed: Oct. 27, 2021

(65) Prior Publication Data

US 2022/0093098 A1   Mar. 24, 2022

Related U.S. Application Data

(63) Continuation of application No. PCT/KR2021/012839, filed on Sep. 17, 2021.

(30) Foreign Application Priority Data

Sep. 23, 2020   (IN) .............................. 202041041137
Aug. 13, 2021   (IN) ............................. 2020 41041137
Sep. 14, 2021   (KR) ........................ 10-2021-0122742

(51) Int. Cl.
*G10L 15/22* (2006.01)
*G06F 3/0481* (2022.01)
(Continued)

(52) U.S. Cl.
CPC ............ *G10L 15/22* (2013.01); *G06F 3/0481* (2013.01); *G06F 3/167* (2013.01); *G06N 3/042* (2023.01);
(Continued)

(58) Field of Classification Search
CPC ....... G10L 15/22; G10L 15/063; G10L 15/16; G10L 15/1815; G10L 15/183;
(Continued)

(56) References Cited

U.S. PATENT DOCUMENTS 6,801,893 B1 * 10/2004 Backfried ............. G10L 15/063
                                                        704/E15.008
7,627,466 B2   12/2009 Ramsey et al.
(Continued)

FOREIGN PATENT DOCUMENTS

KR   10-2440651 B1    9/2022
WO   2018/191234 A1   10/2018

OTHER PUBLICATIONS

Indian Examination Report dated Apr. 25, 2022, issued in Indian Application No. 202041041137.
(Continued)

*Primary Examiner* — Pierre Louis Desir
*Assistant Examiner* — Daniel W Chung
(74) *Attorney, Agent, or Firm* — Jefferson IP Law, LLP

(57) ABSTRACT

A method for controlling an electronic device is provided. The method includes identifying one or more user interface (UI) elements displayed on a screen of an electronic device, determining a characteristic(s) of one or more identified UI elements, generating a data base based on the characteristic of one or more identified UI elements, where the database comprises to predict NL utterances of one or more identified UI elements, where the NL utterances are predicted based on the at least one characteristic of one or more identified UI (Continued)

elements, receiving a voice input of a user of the electronic device, where the voice input comprises an utterance indicative of the at least one characteristic of one or more identified UI elements presented in the database, and automatically accessing UI element(s) of one or more UI elements in response to determining that the utterances of the received voice input from the user matches with the predicted NL utterances of one or more identified UI elements.

17 Claims, 14 Drawing Sheets

(51) Int. Cl.
| | |
|---|---|
| *G06F 3/16* | (2006.01) |
| *G06N 3/042* | (2023.01) |
| *G10L 15/06* | (2013.01) |
| *G10L 15/16* | (2006.01) |
| *G10L 15/18* | (2013.01) |
| *G10L 15/183* | (2013.01) |
| *G10L 15/30* | (2013.01) |

(52) U.S. Cl.
CPC ............ *G10L 15/063* (2013.01); *G10L 15/16* (2013.01); *G10L 15/1815* (2013.01); *G10L 15/183* (2013.01); *G10L 15/30* (2013.01); *G10L 2015/223* (2013.01)

(58) Field of Classification Search
CPC ... G10L 15/30; G10L 2015/223; G06N 3/042; G06F 3/0481; G06F 3/167
See application file for complete search history.

(56) References Cited

U.S. PATENT DOCUMENTS

| | | | |
|---|---|---|---|
| 9,269,356 B2 | 2/2016 | Han et al. | |
| 9,489,375 B2 | 11/2016 | Koll et al. | |
| 9,600,227 B2 | 3/2017 | P.V et al. | |
| 10,176,036 B2 | 1/2019 | Haridas et al. | |
| 10,217,059 B2 | 2/2019 | Yang et al. | |
| 10,515,625 B1 | 12/2019 | Metallinou et al. | |
| 10,553,203 B2 | 2/2020 | Dolph et al. | |
| 11,150,870 B2 | 10/2021 | Lee et al. | |
| 2002/0095294 A1* | 7/2002 | Korfin ................... | G06F 3/167 |
| | | | 704/E15.04 |
| 2003/0117365 A1* | 6/2003 | Shteyn ................. | G06F 3/0481 |
| | | | 704/E15.045 |
| 2013/0246050 A1* | 9/2013 | Yu .......................... | G10L 21/00 |
| | | | 704/9 |
| 2015/0019710 A1 | 1/2015 | Shaashua et al. | |
| 2015/0169285 A1 | 6/2015 | Reyes et al. | |
| 2016/0034253 A1* | 2/2016 | Bang .................... | H04M 1/724 |
| | | | 715/728 |
| 2016/0260430 A1 | 9/2016 | Panemangalore et al. | |
| 2017/0221482 A1 | 8/2017 | Baldwin et al. | |
| 2017/0255445 A1* | 9/2017 | Seolas ...................... | G06F 8/38 |
| 2018/0341466 A1* | 11/2018 | Upadhyay ............. | G06F 3/0481 |
| 2019/0340200 A1 | 11/2019 | Coimbra et al. | |
| 2020/0225908 A1 | 7/2020 | Lee et al. | |
| 2021/0090555 A1* | 3/2021 | Mahmood ............. | G10L 13/033 |
| 2022/0293106 A1* | 9/2022 | Kim .................... | H04N 21/2665 |

OTHER PUBLICATIONS

International Search Report dated Dec. 20, 2021, issued in International Application No. PCT/KR2021/012839.
Indian Hearing Notice dated Aug. 27, 2024, issued in Indian Patent Application No. 202041041137.

* cited by examiner

ELECTRONIC APPARATUS AND METHOD FOR CONTROLLING USER INTERFACE ELEMENTS BY VOICE

CROSS-REFERENCE TO RELATED APPLICATION(S)

This application is a continuation application, claiming priority under § 365(c), of an International application No. PCT/KR2021/012839, filed on Sep. 17, 2021, which is based on and claims the benefit of an Indian patent application number 202041041137, filed on Sep. 23, 2020, in the Indian Intellectual Property Office, of an Indian patent application number 202041041137, filed on Aug. 13, 2021, in the Indian Intellectual Property Office, and of a Korean patent application number 10-2021-0122742, filed on Sep. 14, 2021, in the Korean Intellectual Property Office, the disclosure of each of which is incorporated by reference herein in its entirety.

BACKGROUND

1. Field

The disclosure relates to a user interface (UI). More particularly, the disclosure relates to a method and an electronic device for automatically accessing UI element(s) of the electronic device by a voice-based interaction.

2. Description of the Related Art

In general, electronic devices (e.g., smart televisions, smartphones, or the like) have gotten increasingly powerful and sophisticated as new applications have emerged (e.g., streaming video applications, such as Netflix, YouTube, or the like). Rather than accessing a list of channels in video applications, users may explore several applications, each application has its layout and features/capabilities. Despite these advancements, using the electronic devices with a touchscreen, a keyboard, a remote controller or a mouse is still unusual. Dominating approach continues to be interaction with the electronic devices, which have a restricted range of inputs and inadequate support for text entry and fine-grained navigation or selection.

Some of the existing methods/electronic devices offer many viable ways to bridge the gap between interface complexity and remote control capabilities. Voice recognition technology is one of them. Intelligent voice agents/assistance, such as Alexa, Siri, and Google Assistant are now integrated into electronic devices, allowing the users to manage the increasingly sophisticated collection of applications accessible on the electronic devices through voice input. For example, a phrase/command/voice input as "Jarvis, good morning" triggers the user's morning ritual. Upon receiving the voice input, the intelligent voice agents/assistance turns on lights, provides weather-related information, goes through news brief, and starts a coffee machine. The user must memorize specific phrases/commands to control the electronic devices, which is a little difficult for non-technical users because the specific phrases/commands were a little unnatural talking (e.g., Schedule a meeting with [name] tomorrow at [location] at [time]) to the home appliances/electronic devices/IoT devices.

FIG. 1 illustrates certain existing methods to fill a gap between an interface complexity and remote control capabilities using an existing electronic device, according to the related art.

Referring to FIG. 1, an existing method (2)/electronic device (10) provide a solution to reduce the gap between the interface complexity and remote control capabilities. For example, the user (1) can access a UI element (e.g., video) of a video application by saying a specific numeric number shown on that UI element. Consider a following scenario in which the user (1) wishes to access a third video that is shown on a screen of an electronic device (10). To play/access the video, the user (1) must utter a specific voice command, such as "play "3" video". However, in order to access the UI element(s) displayed on the screen of the electronic device (10), the user (1) must remain close to the electronic device (10) in order to read the name of the UI element(s) or the number of UI element(s), which is not always practicable. Furthermore, uttering the specific voice command is not a natural way to access/invoke the UI element. Furthermore, the user (1) cannot access the sub functionality or sub-page of this video application that are not displayed on the screen of the electronic device (10).

In another existing method (3)/electronic device (10) provide a solution to reduce the gap between interface complexity and remote control capabilities, as illustrated in FIG. 1. For example, the user (1) can access UI element(s) (e.g., search bar, home icon, like button, share button, or the like) of a social media application by saying a "Show names" to show an overlay with UI element(s) names or by saying a "Show names" to display an overlay with UI element(s) names. If the UI element(s) do not have a name, or if the user (1) prefers to use numbers instead, the user (1) can say "Show Numbers" to show numeric tags for each UI element(s) on the screen of the electronic device (10). However, the user (1) may only access the UI element(s) that are displayed on the screen of the electronic device (10) using this method (3). The user (1) cannot access the sub functionality or sub-page of this social media application that are not displayed on the screen of the electronic device (10). Furthermore, in order to access the UI element(s) displayed on the screen of the electronic device (10), the user (1) must remain close to the electronic device (10) in order to read the name of the UI element(s) or the number of UI element(s), which is not always practicable.

In another example, consider a scenario in which the user (1) wishes to access a search page, as illustrated in FIG. 1. Some existing methods (4)/electronic devices (10) usually provide a limited set of control and search instructions and do not support deeper recommendation or exploration queries. Table-1 illustrates an example of the limited set of control.

TABLE 1

| User commands | Existing methods (4) | Remarks |
|---|---|---|
| Wikipedia | Supported | User can access |
| Click Wikipedia | Supported | User can access |
| Could you please click on Wikipedia | Not supported | Expressive utterances are not understood |
| Click the button on the left top corner | Not supported | Relative position is not understood |
| Click on the home shaped icon | Not supported | The shape of the non-textual elements not supported |
| Click on Wikipedia | Not supported | Phonetic Transliteration isn't supported |
| Bookmark this page | Not supported | Multi-step commands aren't supported |
| Open the Wiki link | Not supported | Partial character matching not supported |

Thus, it is desired to provide a useful alternative for automatically accessing UI element(s) of the electronic device by using the voice input/voice-based interaction.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to automatically access one or more identified user interface (UI) elements (e.g., an actionable UI element, a non-actionable UI element, a textual UI element, and a non-textual UI element) displayed on a screen of an electronic device when a user's voice input matches anticipated natural language (NL) utterances of one or more identified UI elements. As a result, a user may utilize natural language to access a variety of identified UI component(s) and enhancing the user's experience. The NL utterances are anticipated by generating a database/knowledge graph based on a characteristic(s) (e.g., a relative position, a capability, a function, a type, an appearance, or the like) of one or more identified UI elements. The user's voice input includes utterance of the characteristic(s) of one or more identified UI elements presented in the database.

Another aspect of the disclosure is to generate the knowledge graph by correlating one of determining a similarity between each UI element of one or more UI elements among other UI elements. The similarity between each UI element of one or more UI elements among other UI elements is determined based on a position of each UI element, the relative position of each UI element among other UI elements, a function of each UI element, a capability of each UI element and an appearance of each UI element displayed on the screen of the electronic device.

Another aspect of the disclosure is to clustering each UI element of one or more UI elements based on the similarity. Furthermore, the electronic device determines a textual representation of the non-textual UI element from a viewable characteristic (e.g., a heart shape icon) and a relative position of each UI element among other UI elements. Furthermore, the electronic device maps pre-defined information (e.g., capability (press, copy), verb (e.g., tap, punch, click, copy, and clone), type (e.g., button, text), or the like) between each UI element of one or more UI elements and corresponding the capability of each UI element, and determines a pre-defined screen sequence transitioned through the actionable UI element.

Another aspect of the disclosure is to perform a semantic translation on the generated knowledge graph to generate NL variations for single-step intent and/or multi-step intent. Furthermore, the electronic device identifies action and action sequence for the single-step intent and/or the multi-step intent using the generated knowledge graph and dynamically generates an NL model to predict the NL utterances corresponding to one or more identified UI elements by mapping the generated NL variations with the identified action and the identified action sequence. As a result, the user may access sub functionality or sub-page of displayed application/UI element(s) that are not displayed on the screen of the electronic device and enhancing the user's experience.

Additional aspects will be set forth in part in the description which follows and, in part, will be apparent from the description, or may be learned by practice of the presented embodiments.

In accordance with an aspect of the disclosure, a method for voice-based interaction of an electronic device is provided. The method includes identifying, by the electronic device, one or more user interface (UI) elements displayed on a screen of the electronic device. Further, the method includes determining, by the electronic device, a characteristic(s) of one or more identified UI elements. Further, the method includes generating, by the electronic device, a database based on the characteristic of one or more identified UI elements, where the database comprises natural language (NL) utterances of one or more identified UI elements, where the NL utterances are predicted based on the at least one characteristic of one or more identified UI elements. Further, the method includes receiving, by the electronic device, a voice input from a user of the electronic device, wherein the voice input comprises an utterance indicative of the characteristic of one or more identified UI elements displayed on the screen of the electronic device. Further, the method includes determining, by the electronic device, whether the utterance of the received voice input matches with the predicted NL utterances corresponding to one or more identified UI elements. Further, the method includes automatically accessing, by the electronic device, UI element(s) of one or more UI elements in response to determining that the utterances of the received voice input from the user match with the predicted NL utterances of one or more identified UI elements.

In an embodiment of the disclosure, where one or more UI elements comprises an actionable UI element, a non-actionable UI element, a textual UI element, and a non-textual UI element.

In an embodiment of the disclosure, where generating, by the electronic device, the database based on the characteristics of one or more identified UI elements includes generating, by the electronic device, a knowledge graph. Further, the method includes storing, by the electronic device, the generated knowledge graph in the database. The knowledge graph is generated by, determining a position of each UI element, a relative position of each UI element among other UI elements, a function of each UI element, a capability of each UI element a type of each UI element, and an appearance of each UI element displayed on the screen of the electronic device. Further, the method includes determining a similarity between each UI element of one or more UI elements among other UI elements based on the position of each UI element, the relative position of each UI element among other UI elements, the function of each UI element, the capability of each UI element and the appearance of each UI element displayed on the screen of the electronic device. Further, the method includes clustering each UI element of one or more UI elements based on the similarity. Further, the method includes determining a textual representation of the non-textual UI element from a viewable characteristic and the relative position of each UI element among other UI elements. Further, the method includes mapping pre-defined information between each UI element of one or more UI elements and corresponding the capability of each UI element. Further, the method includes determining a pre-defined screen sequence transitioned through the actionable UI element.

In an embodiment of the disclosure, where predicting the NL utterances corresponding to one or more identified UI elements includes performing, by the electronic device, a semantic translation on the generated knowledge graph to generate NL variations for single-step intent and/or multi-step intent. Further, the method includes identifying, by the electronic device, action and action sequence for the single-step intent and the multi-step intent using the generated knowledge graph. Further, the method includes dynamically generating, by the electronic device, an NL model to predict the NL utterances corresponding to one or more identified UI elements by mapping the generated NL variations with the identified action and the identified action sequence.

In an embodiment of the disclosure, where performing, by the electronic device, the semantic translation on the generated knowledge graph to generate the NL variations for single-step intent and/or multi-step intent includes receiving, by the electronic device, the generated knowledge graph. Further, the method includes categorizing, by the electronic device, each UI element of the received knowledge graph into a domain, a verb, a synonym, a slot, a slot type, a textually represented slot, a capability, and the relative position on the screen of the electronic device. Further, the method includes generating, by the electronic device, the NL variations based on the categorization.

In an embodiment of the disclosure, where identifying, by the electronic device, the action and the action sequence for the single-step intent and the multi-step intent using the generated knowledge graph includes receiving, by the electronic device, the generated knowledge graph. Further, the method includes determining, by the electronic device, action routines based on the capability of each UI element.

In an embodiment of the disclosure, where dynamically generating, by the electronic device, the NL model to predict the NL utterances of one or more identified UI elements by mapping the generated NL variations and the identified action and the identified action sequence includes clustering, by the electronic device, similar NL variations. Further, the method includes assigning, by the electronic device, a dynamic intent for the similar NL variations. Further, the method includes associating, by the electronic device, the dynamic intent with the identified action and the identified action sequence. Further, the method includes dynamically generating, by the electronic device, the NL model based on the clustered NL variation, the dynamic intent, and the action routines. Further, the method includes storing, by the electronic device, the dynamically generated NL model in the database.

In an embodiment of the disclosure, where determining, by the electronic device, whether utterances of the received voice input match with the predicted NL utterances of one or more identified UI elements includes determining a textual representation score by reading the screen information displayed on the screen of the electronic device, where the screen information is in the form of textual representation/textual UI elements (s), extracting synonyms for verbs and nouns from the textual representation/textual UI element(s) and assign a synonym score, where a distance between the synonyms and the primary representation (textual representation) grows, the synonym score falls, determining a variance score associating NL variations generated which can be used to make weighted training into the dynamic language generator, determining a relevance score by comparing nearby element information with reference objects mentioned in the utterance of the received voice input, determining a matching score as final score which matches the utterance of the received voice input against the dynamic language generator and combines it with the relevance score. The matching score determines the target element (i.e., UI element(s)) on which action has to be taken. In case of similar scores, the user is presented with option to choose among the conflicting elements.

In an embodiment of the disclosure, the characteristic of one or more identified UI elements comprises the relative position of each UI element among other UI elements, the function of each UI element, the capability of each UI element the type of each UI element, and the appearance of each UI element displayed on the screen of the electronic device.

In accordance with another aspect of the disclosure, an electronic device for the voice-based interaction is provided. The electronic device includes an interaction engine coupled with a processor and a memory. The interaction engine is configured to identify one or more UI elements displayed on the screen of the electronic device. Further, the interaction engine is configured to determine the characteristic(s) of one or more identified UI elements. Further, the interaction engine is configured to generate the database based on the characteristic(s) of one or more identified UI elements to predict the NL utterances of one or more identified UI elements. Further, the interaction engine is configured to receive the voice input from the user of the electronic device, where the voice input comprises the utterance indicative of the characteristic(s) of one or more identified UI elements presented in the database. Further, the interaction engine is configured to determine whether the utterance of the received voice input matches with the predicted NL utterances of one or more identified UI elements. Further, the interaction engine is configured to automatically access UI element(s) of one or more UI elements in response to determining that the utterances of the received voice input from the user match with the predicted NL utterances of one or more identified UI elements.

In an embodiment of the disclosure, a priority is determined between conflicting commands matches based on certain priority rules fed into the electronic device. Ex. Go to Home. Here home can mean application home or system home.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
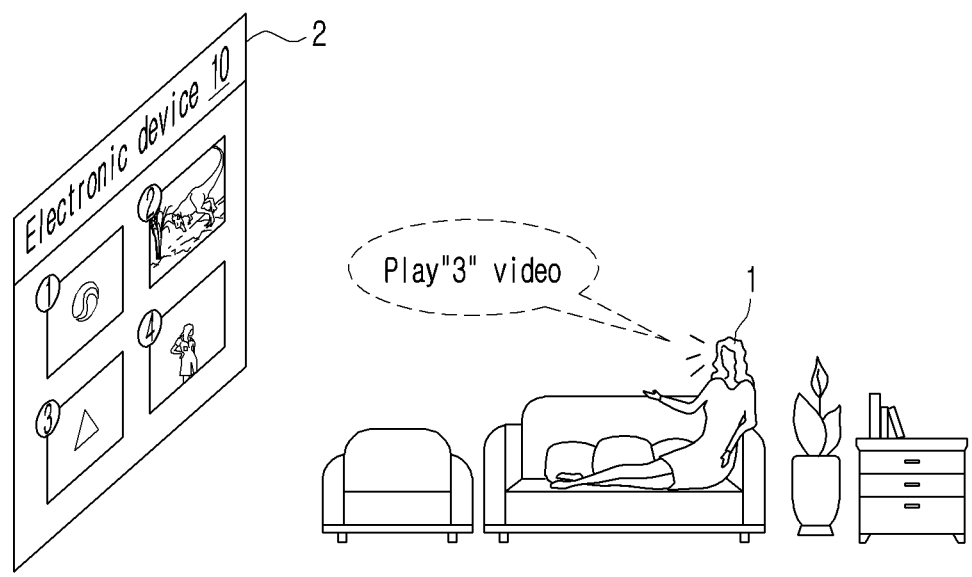
FIG. 1 illustrates certain existing methods to fill a gap between an interface complexity and remote control capabilities using an existing electronic device according to the related art.
Figure 1:
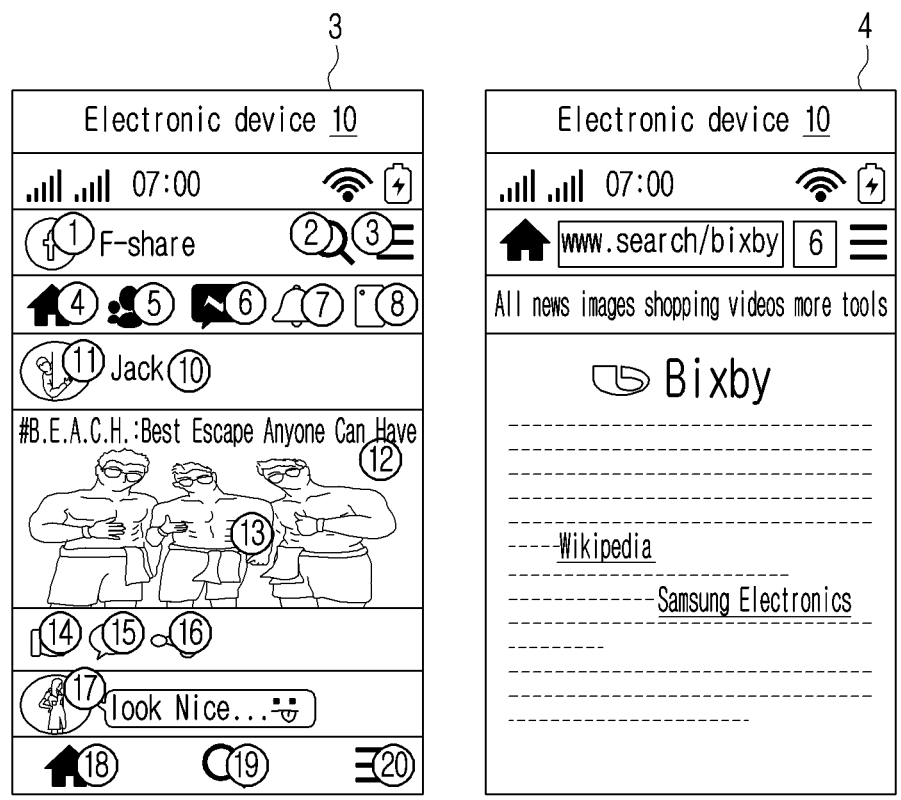

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, embodiments herein disclose a method for voice-based interaction of an electronic device. The method includes identifying, by the electronic device, one or more user interface (UI) elements displayed on a screen of the electronic device. Further, the method includes determining, by the electronic device, a characteristic(s) of one or more identified UI elements. Further, the method includes generating, by the electronic device, a database based on the characteristic of one or more identified UI elements, where the database comprises natural language (NL) utterances of one or more identified UI elements, where the NL utterances are predicted based on the at least one characteristic of one or more identified UI elements. Further, the method includes receiving, by the electronic device, a voice input from a user of the electronic device, where the voice input comprises an utterance indicative of the characteristic of one or more identified UI elements presented in the database. Further, the method includes determining, by the electronic device, whether the utterance of the received voice input matches with the predicted NL utterances of one or more identified UI elements. Further, the method includes automatically accessing, by the electronic device, UI element(s) of one or more UI elements in response to determining that the utterances of the received voice input from the user match with the predicted NL utterances of one or more identified UI elements.

Accordingly, the embodiments herein provide the electronic device for the voice-based interaction. The electronic device includes an interaction engine coupled with a processor and a memory. The interaction engine is configured to identify one or more UI elements displayed on the screen of the electronic device. Further, the interaction engine is configured to determine the characteristic(s) of one or more identified UI elements. Further, the interaction engine is configured to generate the database based on the characteristic(s) of one or more identified UI elements to predict the NL utterances of one or more identified UI elements. Further, the interaction engine is configured to receive the voice input from the user of the electronic device, where the voice input comprises the utterance indicative of the characteristic(s) of one or more identified UI elements presented in the database. Further, the interaction engine is configured to determine whether the utterance of the received voice input matches with the predicted NL utterances of one or more identified UI elements. Further, the interaction engine is configured to automatically access UI element(s) of one or more UI elements in response to determining that the utterances of the received voice input from the user match with the predicted NL utterances of one or more identified UI elements.

Unlike existing methods and systems, the proposed method allows the electronic device to automatically access one or more identified UI elements (e.g., an actionable UI element, a non-actionable UI element, a textual UI element, and a non-textual UI element) displayed on the screen of an electronic device when the user's voice input matches anticipated NL utterances of one or more identified UI elements. As a result, the user may utilize natural language to access the variety of identified UI component(s) from a distance and enhancing the user's experience. The NL utterances are anticipated by generating the database/knowledge graph based on the characteristic(s) (e.g., a relative position, a capability, a function, a type, an appearance, or the like) of one or more identified UI elements. The user's voice input includes utterance of the characteristic(s) of one or more identified UI elements presented in the database.

Unlike existing methods and systems, the proposed method allows the electronic device to generate the knowledge graph by correlating one of determining a similarity between each UI element of one or more UI elements among other UI elements, clustering each UI element of one or more UI elements based on the similarity, determining a textual representation of the non-textual UI element from a viewable characteristic and the relative position of each UI element among other UI elements, mapping pre-defined information between each UI element of one or more UI elements and corresponding the capability of each UI element, and determining a pre-defined screen sequence transitioned through the actionable UI element. The similarity between each UI element of one or more UI elements among other UI elements is determined based on a position of each UI element, a relative position of each UI element among other UI elements, a function of each UI element, a capability of each UI element and an appearance of each UI element displayed on the screen of the electronic device.

Unlike existing methods and systems, the proposed method allows the electronic device to perform a semantic translation on the generated knowledge graph to generate NL variations for single-step intent and/or multi-step intent. Furthermore, the electronic device identifies the action and action sequence for the single-step intent and/or the multi-step intent using the generated knowledge graph and dynamically generates an NL model to predict the NL utterances of one or more identified UI elements by mapping the generated NL variations with the identified action and the identified action sequence. As a result, the user may access sub functionality or sub-page of displayed application/UI element(s) that are not displayed on the screen of the electronic device and enhancing the user's experience.

Referring now to the drawings and more particularly to FIGS. 2A through 9C, where similar reference characters denote corresponding features consistently throughout the figures, there are shown preferred embodiments.

Figure 2A:
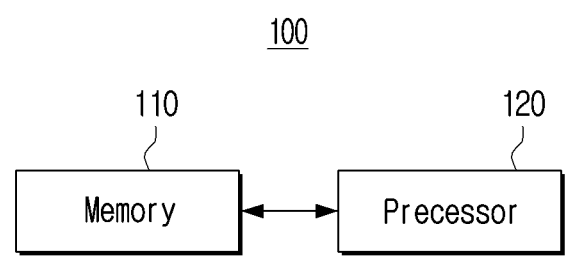
FIGS. 2A and 2B illustrate block diagrams of an electronic device for automatically accessing user interface (UI) element(s) displayed on a screen of the electronic device based on voice interaction of a user with the electronic device according to various embodiments of the disclosure.

FIG. 2A illustrates a block diagram of an electronic device (100) for automatically accessing UI element(s) displayed on a screen of the electronic device based on voice interaction of a user with the electronic device according to an embodiment of the disclosure. The electronic device (100) can be, for example, but not limited to a smartphone, a tablet, a laptop, an internet of things (IoT) device, a smart glass, a smartwatch, or alike.

Referring to FIG. 2A, in an embodiment of the disclosure, the electronic device (100) includes a memory (110) and, a processor (120).

The memory (110) stores characteristic(s) of one or more identified UI elements, a database/knowledge graph, and characteristic(s) of one or more identified UI elements. Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in a random access memory (RAM) or cache). The memory (110) can be an internal storage unit or it can be an external storage unit of the electronic device (100), a cloud storage, or any other type of external storage.

The processor (120) communicates with the memory (110), the communicator (130), the display/screen (140), the sensor(s) (150), the application controller (160), and the interaction engine (170). The processor (120) is configured to execute instructions stored in the memory (110) and to perform various processes. The processor (120) may include one or one or more processors, maybe a general-purpose processor, such as a central processing unit (CPU), an application processor (AP), or the like, a graphics-only processing unit, such as a graphics processing unit (GPU), a visual processing unit (VPU), and/or an AI dedicated processor, such as a neural processing unit (NPU).

According to an embodiment of the disclosure, the processor 120 may identify at least one characteristic of at least one user interface (UI) element included in a screen 140 of the electronic device 100, and acquire a database based on the at least one characteristic of the identified UI element. Here, the database may include a natural language utterance acquired based on the at least one characteristic of the identified UI element. Here, the at least one characteristic may include at least one of relative positions of the respective UI elements, functions of the respective UI elements, capabilities of the respective UI elements, types of the respective UI elements, or appearances of the respective UI elements. In this case, the database may be generated in real time based on the current screen 140 of the electronic device 100.

Afterwards, when a user's voice input is received, the processor 120 may identify whether an utterance of the received voice input matches the natural language utterance included in the database, and if it is identified that the utterance of the voice input matches the natural language utterance, the processor 120 may automatically access the at least one UI element. Here, the at least one UI element may include at least one of an actionable UI element, a non-actionable UI element, a textual UI element, or a non-textual UI element.

Meanwhile, the processor 120 may identify whether the utterance of the received voice input matches the natural language utterance included in the database through a plurality of matching steps. Hereinafter, it will be described that a textual UI element, a synonym (or a homonym) of the textual UI element, and a non-textual UI element are sequentially compared, but the disclosure is not necessarily limited to such an order.

According to an embodiment of the disclosure, the processor 120 may firstly compare the utterance of the voice input with a natural language utterance corresponding to a textual UI element included in the database. Here, the textual UI element may be an actionable UI element. For example, the processor 120 may, if a natural language utterance corresponding to a textual UI element is identified in the database as a result of the first comparison corresponding to the utterance of the voice input (e.g., if a natural language utterance having similarity greater than or equal to a threshold numerical value is identified), automatically access the identified textual UI element.

According to an embodiment of the disclosure, the second comparison may not be proceeded in case a specific textual UI element is identified as a result of the first comparison, but the disclosure is not limited thereto, and even if a specific textual UI element is identified as a result of the first comparison, the second comparison may be proceeded for a more correct matching.

In addition, the processor 120 may secondly compare the utterance of the voice input with a natural language utterance corresponding to a synonym of the textual UI element included in the database according to the result of the first comparison. For example, the processor 120 may, if a natural language utterance corresponding to a synonym (or a homonym) of a textual UI element is identified in the database as a result of the second comparison (e.g., if a natural language utterance having similarity greater than or equal to the threshold numerical value is identified), automatically access the textual UI element. In this case, the processor 120 may identify the textual UI element not only based on the second comparison result but also based on the first comparison result.

According to an embodiment of the disclosure, the third comparison may not be proceeded in case a specific textual UI element is identified as a result of the second comparison, but the disclosure is not limited thereto, and even if a specific textual UI element is identified as a result of the second comparison, the third comparison may be proceeded for a more correct matching.

In addition, the processor 120 may thirdly compare the utterance of the voice input with a natural language utterance corresponding to a shape of a non-textual UI element included in the database according to the result of the second comparison. Here, the non-textual UI element may be an actionable UI element. For example, the processor 120 may, if a natural language utterance corresponding to a shape of a non-textual UI element is identified in the database as a result of the third comparison (e.g., if a natural language utterance having similarity greater than or equal to a threshold numerical value is identified), automatically access the identified non-textual UI element. In this case, the processor 120 may identify the non-textual UI element not only based on the third comparison result but also at least one of the first comparison result or the second comparison result.

In addition, the processor 120 may acquire a learning result of a neural network model stored in the database, and identify whether the utterance of the voice input matches the natural language utterance based on at least one of the result of the first comparison, the result of the second comparison, or the result of the third comparison and the learning result. Here, the neural network model is a model which is trained by various learning data and is trained to output a matching result, and detailed explanation in this regard will be made later.

Further, the processor 120 may acquire a matching score for at least one UI element included in the screen. Here, the matching score may be acquired based on similarity by comparing the utterance of the voice input with a natural language utterance corresponding to a UI element included in the database.

In this case, in case matching scores of a plurality of respective UI elements included in the screen are greater than or equal to a first threshold numerical value, and differences of the matching scores of the plurality of respective UI elements are within a second threshold numerical value, the processor 120 may provide a guide UI for selecting any one of the plurality of UI elements. Here, the first threshold numerical value may be preset as a numerical value for identifying identicalness/similarity between the utterance of the voice input and a natural language utterance corresponding to a UI element included in the database, or it may be set by a user. In addition, the second threshold numerical value may be preset as a numerical value for identifying the degree that the degrees of matching of the plurality of respective UI elements can be deemed to be identical/similar, or it may be set by a user.

In addition, in case a matching score of one UI element is greater than or equal to the first threshold numerical value, and the matching scores of the other UI elements are greater than the second threshold numerical value, the processor 120 may access the one UI element, i.e., execute the UI element. Meanwhile, in this case, the processor 120 may also provide a guide UI requesting a user's confirmation on execution for the one UI element.

In addition, in case matching scores of all UI elements included in the screen are smaller than the first threshold numerical value, the processor 120 may provide a guide UI providing the information. For example, the processor 120 may provide information that a UI element corresponding to a user's voice input cannot be identified. Meanwhile, it is also possible that the processor 120 provides a UI element having the biggest matching score as a recommended UI element in this case.

Further, the processor 120 may identify at least one of positions of the respective UI elements, relative positions of the respective UI elements for the other UI elements, functions of the respective UI elements, capabilities of the respective UI elements, types of the respective UI elements, or shapes of the respective UI elements, and acquire a knowledge graph, and store the acquired knowledge graph in the database.

In addition, the processor 120 may identify similarity between respective UI elements based on positions of the respective UI elements, and similarity between at least one of relative positions of the respective UI elements, functions of the respective UI elements, capabilities of the respective UI elements, or shapes of the respective UI elements, acquire a knowledge graph by clustering the respective UI elements based on the identified similarity, and store the acquired knowledge graph in the database.

In addition, the processor 120 may determine a textual representation of a non-textual UI element from viewable characteristics and the relative positions of the respective UI elements.

Further, the processor 120 may map pre-defined information corresponding to the respective UI elements and the capabilities of the respective UI elements and acquire a knowledge graph, and store the acquired knowledge graph in the database. In this case, the processor 120 may determine a pre-defined screen sequence transitioned through an actionable UI element in the screen and acquire a knowledge graph.

In addition, the processor 120 may determine a pre-defined screen sequence transitioned through an actionable UI element in the screen and acquire a knowledge graph.

In addition, the processor 120 may perform a semantic translation on a knowledge graph to acquire natural language variations for at least one of a single-step intent or a multi-step intent, identify at least one action and at least one action sequence for at least one of the single-step intent or the multi-step intent using the knowledge graph, and dynamically generate a natural language model for predicting a natural utterance of the identified UI element by mapping the acquired natural language variations with the identified action and the identified action sequence.

Further, the processor 120 may categorize the respective UI elements of the knowledge graph into at least one of domains, verbs, synonyms, slots, slot types, textually represented slots, capabilities, or the relative positions on the screen 140, and acquire the natural language variations based on the categorization.

In addition, the processor 120 may determine a pre-defined table set including information related to the types of the UI elements included in the screen 140 and capabilities corresponding thereto, verbs related to the capabilities, capabilities for action information, element sequence graphs actionable on the screen and corresponding action sequences, and pre-defined actions and action sequences, and determine action routines based on the capabilities of the respective UI elements. In this case, unique identities may be assigned to the pre-defined actions and action sequences.

In addition, the processor 120 may cluster the similar natural language variations, assign dynamic intents for the similar natural language variations, associate the at least one identified action and the at least one identified action sequence with the dynamic intents, dynamically generate the natural language model based on the clustered natural language variations, the dynamic intents, and the action routines, and store the natural language model in the database.

Further, the processor 120 may determine a textual representation score by reading screen information included in the screen 140, extract synonyms for verbs and nouns from the textual representation and textual UI elements included in the screen information and assign a synonym score, determine a dispersion score associating the natural language variations used for weighted training for a dynamic language generator 170E, and determine a relevance score by comparing reference objects included in the utterance of the voice input with nearby element information.

In addition, the processor 120 may determine a matching score as a final score matched with the utterance of the voice input for the dynamic language generator 170E, and combine the determined matching score with the relevance score.

Figure 2B:
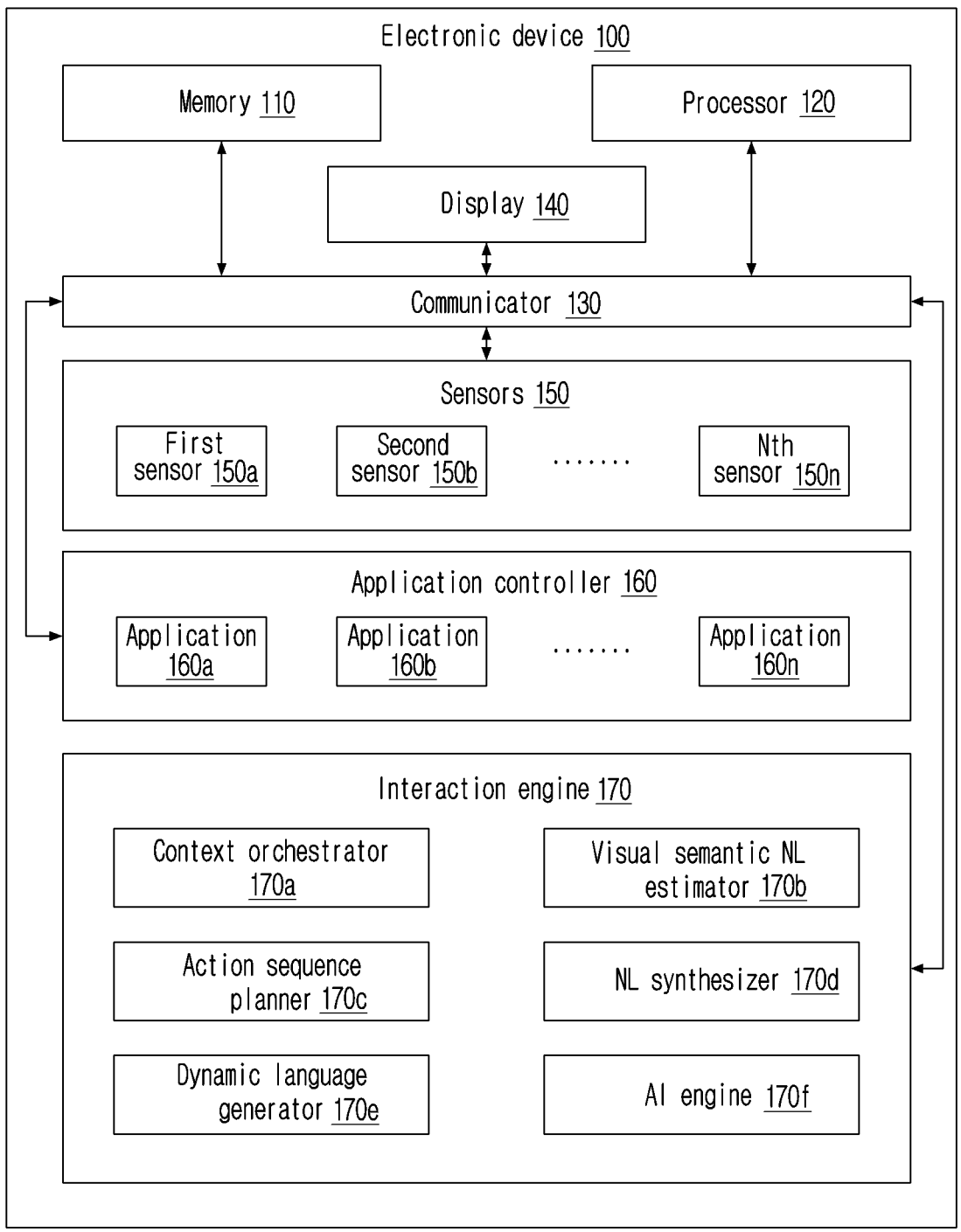

FIG. 2B illustrates a block diagram of an electronic device (100) for automatically accessing UI element(s) displayed on a screen (140) of the electronic device (100) based on voice interaction of a user with the electronic device (100), according to an embodiment of the disclosure. In an embodiment of the disclosure, the electronic device (100) includes a memory (110), a processor (120), a communicator (130), a display (140) (i.e., a screen), a sensor(s) (150), an application controller (160) and an interaction engine (170).

Referring to FIG. 2B, the communicator (130) includes an electronic circuit specific to a standard that enables wired or wireless communication. The communicator (130) is configured for communicating internally between internal hardware components and with external devices via one or more networks. The sensor(s) (150 or 150*a-n*) can be, for example, but not limited to an ambient light sensor, a 3-axis accelerometer, an altimeter, an optical heart rate sensor, an oxygen saturation (SpO2) monitor, a bioimpedance sensor, a proximity sensor, a compass, an electrocardiogram (ECG) sensor, a global positioning system (GPS), a gyroscope, a gesture sensor, an ultraviolet (UV) sensor, a magnetometer, an electrodermal activity sensor, a skin temperature sensor, or the like.

The application controller (160) is configured to control one or more applications (160*a*-160*n*) of the electronic device (100). Examples for the application are, but not limited to a media application, a web application, a video player application, a camera application, a business application, an education application, a health application, a lifestyle application, an entertainment application, a utility application, a travel application, or the like.

In an embodiment of the disclosure, the interaction engine (170) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment of the disclosure, the interaction engine (170) includes a context orchestrator (170*a*), a visual semantic NL estimator (170*b*), an action sequence planner (170*c*), a NL synthesizer (170*d*), a dynamic language generator (170*e*) (e.g., voice assistant) and an Artificial intelligence (AI) engine (170*f*).

In an embodiment of the disclosure, the context orchestrator (170*a*) identifies one or more UI elements displayed on the screen (140) of the electronic device (100) using the AI engine (170*f*). One or more UI elements (i.e., a click button, a home an icon, a text bar, or the like) includes an actionable UI element, a non-actionable UI element, a textual UI element, and a non-textual UI element. Further, the context orchestrator (170*a*) determines a characteristic(s) of one or more identified UI elements) using the AI engine (170*f*). The characteristic(s) of one or more identified UI elements includes a position of each UI element, a relative position of each UI element among other UI elements, a function of each UI element, a capability of each UI element a type of each UI element, and an appearance of each UI element displayed on the screen (140) of the electronic device (100).

Further, the context orchestrator (170*a*) generates the database/knowledge graph based on the characteristic(s) of one or more identified UI elements) using the AI engine (170*f*). Further, the context orchestrator (170*a*) determines the position of each UI element, the relative position of each UI element among other UI elements, the function of each UI element, the capability of each UI element, the type of each UI element, and the appearance of each UI element displayed on the screen (140) of the electronic device (100). Further, the context orchestrator (170*a*) determines a similarity between each UI element of one or more UI elements among other UI elements based on the position of each UI element, the relative position of each UI element among other UI elements, the function of each UI element, the capability of each UI element and the appearance of each UI element displayed on the screen (140) of the electronic device (100). Further, the context orchestrator (170*a*) clusters each UI element of one or more UI elements based on the similarity. Further, the context orchestrator (170*a*) determines a textual representation of the non-textual UI element from a viewable characteristic and the relative position of each UI element among other UI elements. Further, the context orchestrator (170*a*) maps pre-defined information between each UI element of one or more UI elements and corresponding the capability of each UI element. Further, the context orchestrator (170*a*) determines a pre-defined screen sequence transitioned through the actionable UI element. Further, the context orchestrator (170*a*) stores the generated knowledge graph in the database.

In an embodiment of the disclosure, the visual semantic NL estimator (170*b*) performs a semantic translation on the generated knowledge graph to generate NL variations for single-step intent and/or multi-step intent. Further, the visual semantic NL estimator (170*b*) receives the generated knowledge graph from the context orchestrator (170*a*). Further, the visual semantic NL estimator (170*b*) categorizes each UI element of the received knowledge graph into a domain, a verb, a synonym, a slot, a slot type, a textually represented slot, a capability, and a relative position on the screen (140) of the electronic device (100). Further, the visual semantic NL estimator (170*b*) generates the NL variations based on the categorization.

In an embodiment of the disclosure, the action sequence planner (170*c*) identifies an action and an action sequence for the single-step intent and/or the multi-step intent using the generated knowledge graph. Further, the action sequence planner (170*c*) receives the generated knowledge graph from the context orchestrator (170*a*). Further, the action sequence planner (170*c*) determines action routines based on the capability of each UI element.

In an embodiment of the disclosure, the NL synthesizer (170*d*) dynamically generates an NL model to predict the NL utterances of one or more identified UI elements by mapping the generated NL variations with the identified action and the identified action sequence. Further, the NL synthesizer (170*d*) clusters similar NL variations. Further, the NL synthesizer (170*d*) assigns a dynamic intent for the similar NL variations. Further, the NL synthesizer (170*d*) associates the dynamic intent with the identified action and the identified action sequence. Further, the NL synthesizer (170*d*) dynamically generates the NL model based on the clustered NL variation, the dynamic intent, and the action routines. Further, the NL synthesizer (170*d*) stores the dynamically generated NL model in the database.

In an embodiment of the disclosure, the dynamic language generator (170*e*) receives input from the NL synthesizer (170*d*). Further, the dynamic language generator (170*e*) receives a voice input from a user of the electronic device (100), where the voice input comprises an utterance indicative of the characteristic of one or more identified UI elements presented in the database. Further, the dynamic language generator (170*e*) determines whether the utterance of the received voice input matches with the predicted NL utterances of one or more identified UI elements. Further, the dynamic language generator (170*e*) automatically access UI element(s) of one or more UI elements in response to determining that the utterances of the received voice input from the user match with the predicted NL utterances of one or more identified UI elements.

At least one of one or more modules/components, as mentioned above, maybe implemented through the AI engine (170*f*). A function associated with the AI engine (170*f*) may be performed through memory (110) and the processor (120). One or a plurality of processors controls the processing of the input data in accordance with a predefined operating rule or the AI engine (170*f*) stored in the non-volatile memory and the volatile memory. The predefined operating rule or artificial intelligence model is provided through training or learning.

Here, being provided through learning means that, by applying a learning process to a plurality of learning data, a predefined operating rule or the AI engine (170*f*) of the desired characteristic is made. The learning may be performed in the electronic device (100) itself in which AI according to an embodiment is performed, and/or maybe implemented through a separate server/system.

The AI engine (170*f*) may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning process is a method for training a predetermined target device (for example, a robot, IoT device(s)) using a plurality of learning data to cause, allow, or control the target device to make a determination or prediction. Examples of learning processes include, but are not limited to, supervised learning, unsupervised learning, semi-supervised learning, or reinforcement learning.

Although FIGS. 2A and 2B show various hardware components of the electronic device (100) but it is to be understood that other embodiments are not limited thereon. In other embodiments of the disclosure, the electronic device (100) may include less or more number of components. Further, the labels or names of the components are used only for illustrative purpose and does not limit the scope of the disclosure. One or more components can be combined together to perform the same or substantially similar function to the voice-based interaction.

Figure 3:
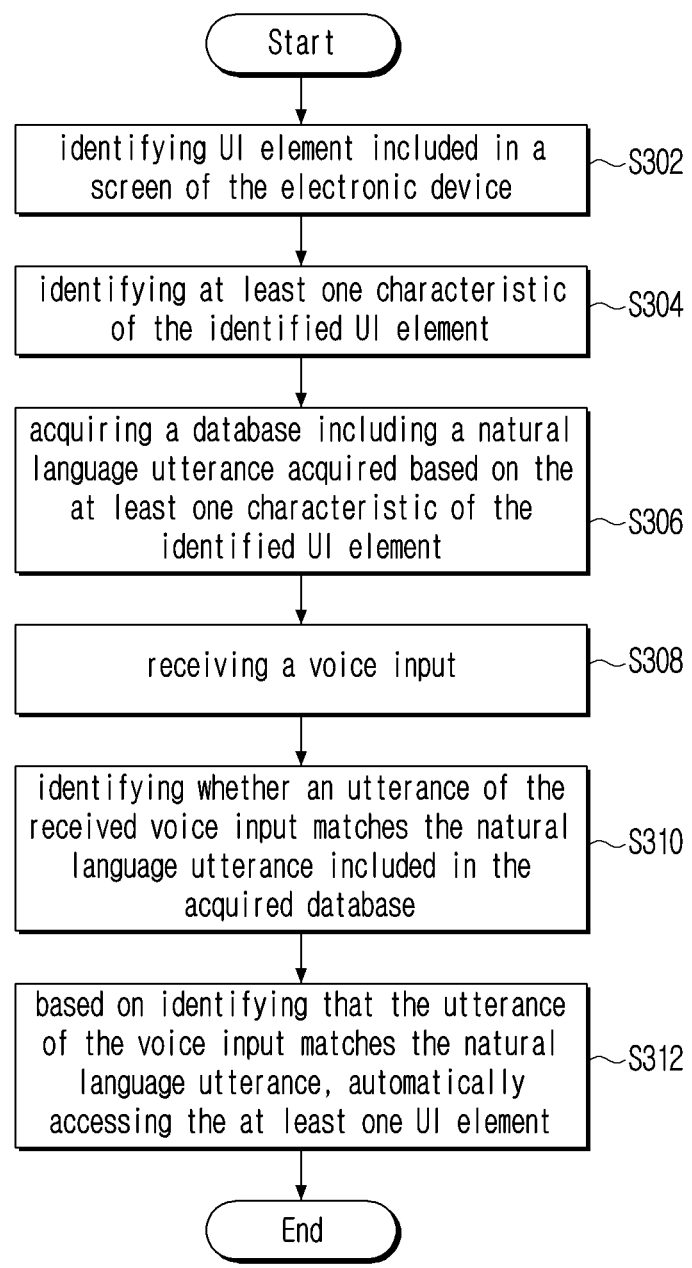
FIG. 3 is a flow diagram illustrating a method for automatically accessing UI element(s) displayed on a screen of an electronic device based on a voice interaction of a user with the electronic device according to an embodiment of the disclosure.

FIG. 3 is a flow (300) diagram illustrating a method for automatically accessing UI element(s) displayed on screen of an electronic device based on a voice interaction of a user with the electronic device according to an embodiment of the disclosure. The operations (S302-S312) are performed by the electronic device 100.

Referring to FIG. 3, at operation S302, the method includes identifying one or more UI elements displayed on the screen (140) of the electronic device (100). At operation S304, the method includes determining the characteristic(s) of one or more identified UI elements. At operation S306, the method includes generating the database based on the characteristic(s) of one or more identified UI elements, where the database comprises NL utterances of one or more identified UI elements, where the NL utterances are predicted based on the at least one characteristic of one or more identified UI elements. At operation S308, the method includes receiving the voice input of the user of the electronic device (100), where the voice input comprises the utterance of the characteristic(s) of one or more identified UI elements presented in the database. At operation S310, the method includes determining whether the utterance of the received voice input matches with the predicted NL utterances of one or more identified UI elements. At operation S312, the method includes automatically accessing the UI element(s) of one or more UI elements in response to determining that the utterances of the received voice input from the user match with the predicted NL utterances of one or more identified UI elements.

The various actions, acts, blocks, steps, or the like in the flow diagram (300) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 4A:
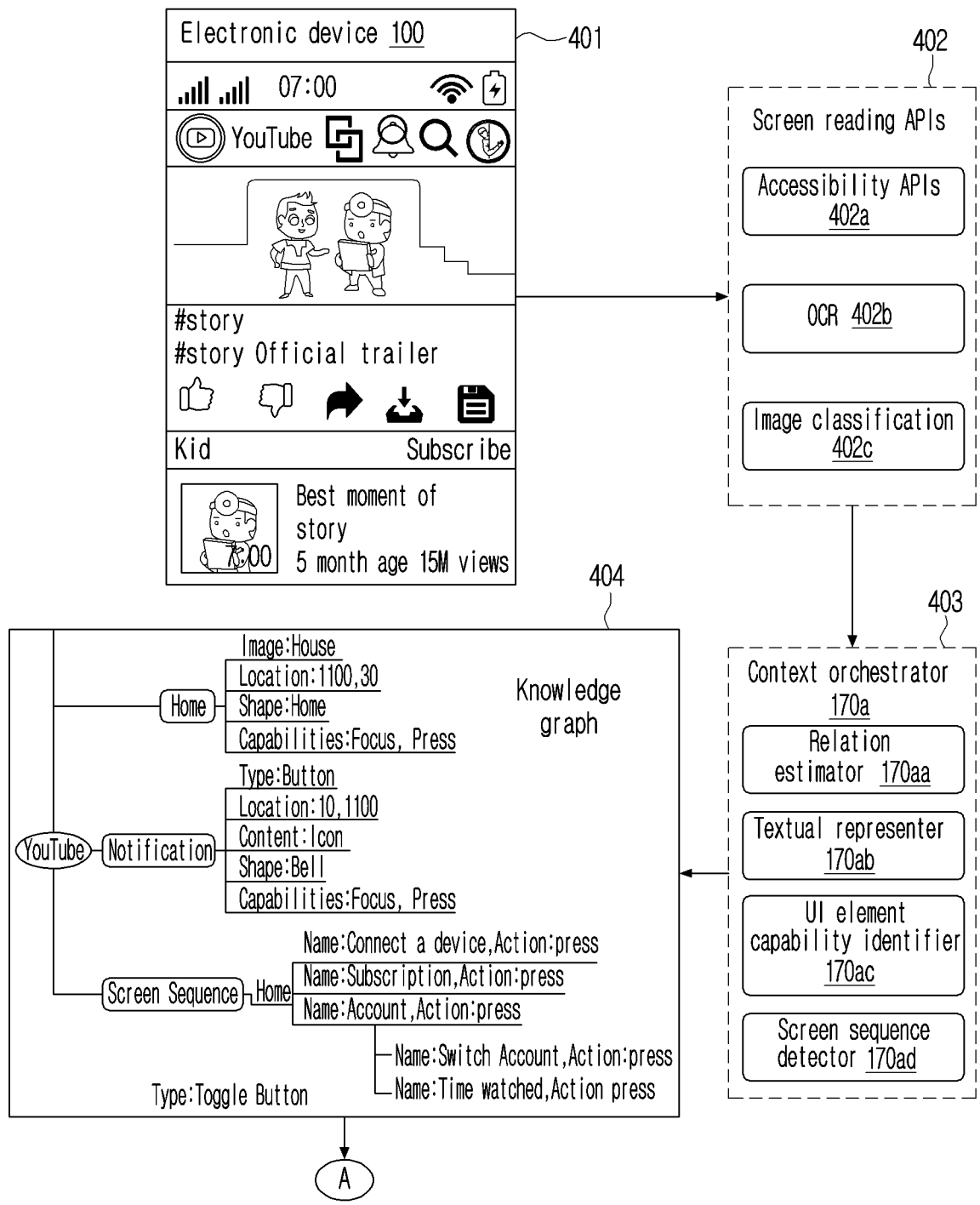
FIGS. 4A and 4B are flow diagrams illustrating method for predicting natural language (NL) utterances of UI element(s) for a video application displayed on a screen of an electronic device and dynamically building models for action simulation associated with the displayed UI element(s) according to various embodiments of the disclosure.
Figure 4B:
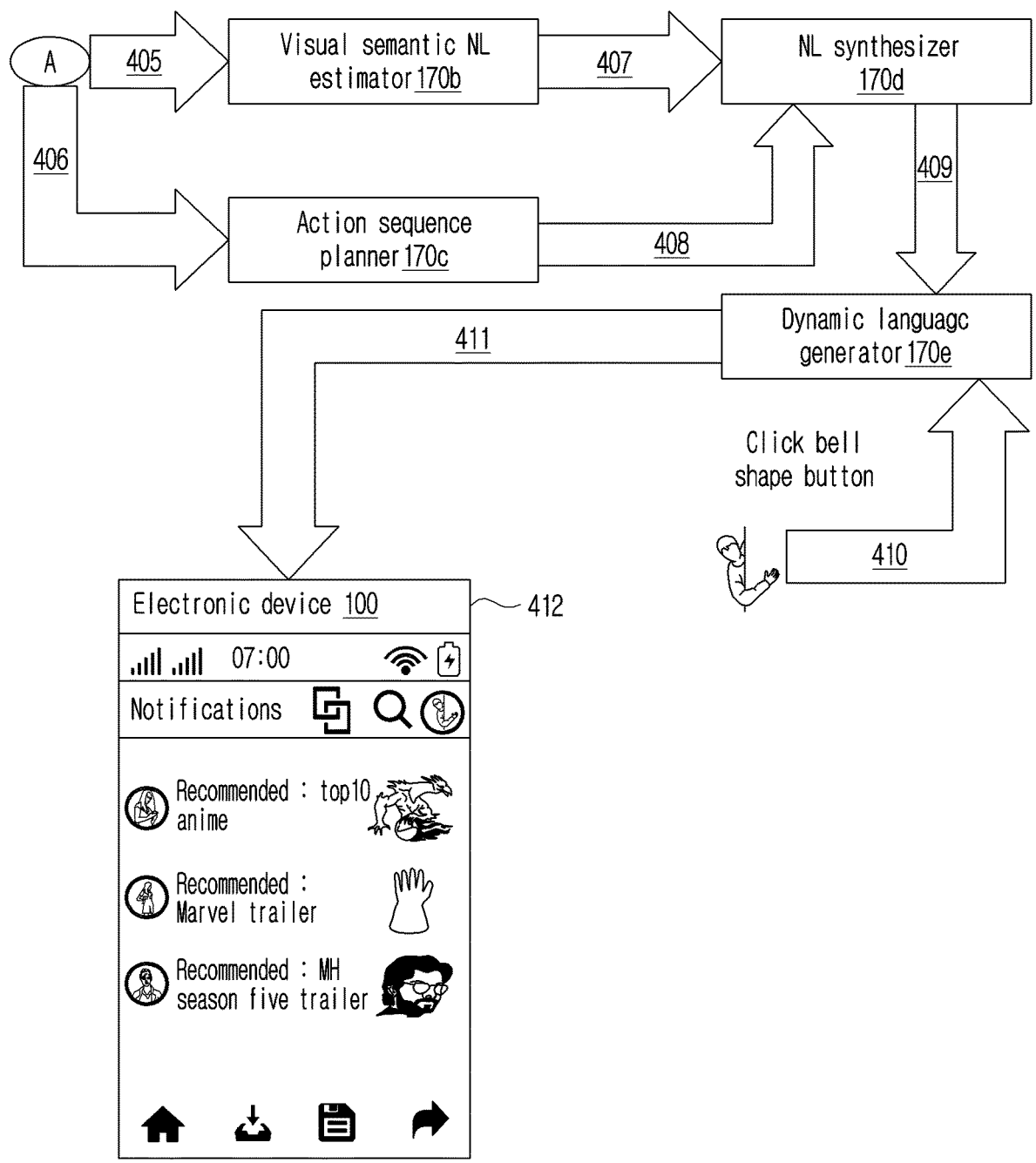

FIGS. 4A and 4B are flow diagrams illustrating a method for predicting NL utterances of UI element(s) for a video application displayed on a screen of an electronic device and dynamically building models for action simulation associated with the displayed UI element(s) according to various embodiments of the disclosure.

Referring to FIGS. 4A and 4B, at 401, consider a scenario in which the user of the electronic device (100) is looking at the screen (140) and wants to check out an unread notification (i.e., bell shape notification icon) of the video application. At 402, platform at 402, screen reading APIs (e.g., Accessibility (402*a*), Optical Character Recognition (OCR) (402*b*), and Image classification (402*c*)) read screen information and corresponding properties. These screen information feds to the context orchestrator (170*a*) to build the knowledge graph.

At 403, the context orchestrator (170*a*) analyzes the screen information, such as a view hierarchy, the content of the UI element(s) (e.g., textual representation and non-textual representation), and the position of the UI element(s). Furthermore, the context orchestrator (170*a*) generates inferences, such as the relative position in the textual representation and the capabilities of the UI element(s). Furthermore, the context orchestrator (170*a*) stores and learns information, such as screen sequence for specified applications (e.g., video application).

In an embodiment of the disclosure, the context orchestrator (170*a*) includes a relation estimator (170*aa*), a textual representer (170*ab*), a UI element capability identifier (170*ac*), and a screen sequence detector (170*ad*). The relation estimator (170*aa*) groups the UI element(s) (e.g., a bell shape icon, a search icon, or the like) and determines the relative position, represents it in the textual representation. Table-2 illustrates an example of input-output of the relation estimator (170*aa*).

TABLE 2

| Input | Output |
| --- | --- |
| Name: Connect Device, Position: 50, 1180, Type: Button | Relation: Left of bell-shaped ButtonGroup: {Textbox, Button} |

TABLE 2-continued

| Input | Output |
| --- | --- |
| Name: Notification, Position: 150, 1180, Type: Button | Relation: Right to connect device buttonGroup: {Textbox, Button} |

The textual representer (170*ab*) converts all the non-textual representation (non-textual content/UI element) into the text representation (textual content/UI element) and makes inferences between all the non-textual representation. Table-3 illustrates an example of input-output of the textual representer (170*ab*).

TABLE 3

| Input | Output |
| --- | --- |
| Name: Home, Position: 50, 1180, Type: Button, Image Buffer< > | Text representation: Shape: Home |
| Name: Notification, Position: 150, 1180, Type: Button, Image Buffer< > | Text representation: Shape: Bell |

The UI element capability identifier (170*ac*) identifies pre-defined capabilities of the UI element(s) (i.e., operable UI elements) and stores capabilities of the UI element(s) into the context orchestrator (170*a*). Table-4 illustrates an example of input-output of the UI element capability identifier (170*ac*).

TABLE 4

| Input | Output |
| --- | --- |
| Name: Home, Position: 50, 1180, Type: Button | Capability: Click, Focus |

The screen sequence detector (170*ad*) determines a view screen transition that contains further actionable UI elements that are recorded as part of the context orchestrator (170*a*). Table-5 illustrates an example of input-output of the screen sequence detector (170*ad*).

TABLE 5

| Input | Output |
| --- | --- |
| Application: YouTube/video application | Home Screen => Account => DataHome Screen => Connect a device |

Furthermore, the context orchestrator (170*a*) generates the knowledge graph (404) by using functionalizes of the relation estimator (170*aa*), the textual representer (170*ab*), the UI element capability identifier (170*ac*), and the screen sequence detector (170*ad*). Table-6 illustrates an example for notification (UI element) of generated knowledge graph (404).

TABLE 6

| UI element | Knowledge graph information |
| --- | --- |
| Notification | Loc: (1020, 10) Name: Notifications Content shape: Bell Content-type: Icon Type: Button Capability: Press, Focus |

At 405, the visual semantic NL estimator (170*b*) receives the generated knowledge graph from the context orchestrator (170*a*). Furthermore, the visual semantic NL estimator (170*b*) categorizes each UI element of the received knowledge graph into the domain, the verb, the synonym, the slot, the slot type, the textually represented slot, the capability, and the relative position (140) on the screen of the electronic device (100). Furthermore, the visual semantic NL estimator (170*b*) generates the NL variations based on the categorization. Table-7 illustrates an example of NL categorization and NL variation for notification (UI element) of the visual semantic NL estimator (170*b*).

TABLE 7

| Domain | Video |
|---|---|
| Application | YouTube |
| NL categorization (notification) | Relation: {Left of Search, Right of Connect}<br>Verb: Touch, Tap, Click.<br>Slot: {Bell <Shape>, Notification <name>}<br>Type: {Button, Icon, Image} |
| NL variation | Click on the bell-shaped button<br>Tap the icon left to search icon |

At 406, the action sequence planner (170*c*) receives the generated knowledge graph from the context orchestrator (170*a*). Furthermore, the action sequence planner (170*c*) determines the action routines/action sequence graphs for single-step and multi-step commands/intents based on the capability of each UI element. Furthermore, the action sequence planner (170*c*) determines the predefined set of action routines/sequences associated with the list of capabilities found in the user interface. The action routines/sequences may be static or dynamic. The static action sequence is tabulated as it does not change in sequence. The dynamic action sequences are constructed on fly based on the screen sequence in the knowledge graph. Table-8 illustrates an example of action routines for the UI element(s) at the action sequence planner (170*c*).

TABLE 8

| UI element type | Capability | Action Routines |
|---|---|---|
| Button | Click | Subroutine: ClickParameters: UI element position |
| Text box | Write | Subroutine: WriteParameters: UI Element, Content |
| Text box | Focus | Subroutine: FocusParameters: UI Element |
| List box | Scroll up | Subroutine: Scroll UpParameters: UI Element |
|  | Multi-step Ex. switch account | Click (Account) > Click (Switch Account) |

Furthermore, the action sequence planner (170*c*) determines action sequence identity based on the screen's actionable UI element graph stored in knowledge of the context orchestrator (170*a*). Screen's actionable element graph can be predefined input or can learn from understanding the user's screen navigation actions (both touch and voice based actions).

At 407-408, the NL synthesizer (170*d*) receives inputs from the visual semantic NL estimator (170*b*) and the action sequence planner (170*c*). The NL synthesizer (170*d*) clusters similar NL variations, where the NL variations are determined by the visual semantic NL estimator (170*b*). The NL synthesizer (170*d*) then assigns the dynamic intent for the similar NL variations and associates the dynamic intent with the identified action and the identified action sequence, where the identified action and the identified action sequence are determined by the action sequence planner (170*c*). Table-9 illustrates an example of similar NL variations with the dynamic intent and the action sequence at the NL synthesizer (170*d*).

TABLE 9

| Dynamic intent | ID-1 |
|---|---|
| NL variations | Click on the bell-shaped button<br>Click search button<br>Tap plus image |
| Action sequence | AS1 |

At 409, the dynamic language generator (170*e*) receives input from the NL synthesizer (170*d*) and dynamically generates the NL model based on the clustered NL variation, the dynamic intent, and the action routines. Furthermore, the dynamic language generator (170*e*) stores the dynamically generated NL model in the database. At 410, the dynamic language generator (170*e*) receives the voice input (e.g., click bell-shaped button). The dynamic language generator (170*e*) determines whether the utterance of the received voice input matches with the predicted NL utterances of one or more identified UI elements. At 411-412, the dynamic language generator (170*e*) automatically accesses the UI element (e.g., notification) of the video application displayed on the screen (140) of the electronic device (100) when the utterances of the received voice input from the user match with the predicted NL utterances of one or more identified UI elements. As a result, the user may utilize natural language to access the identified UI element(s) which enhances the user's experience. The proposed method makes user interaction simpler for the user to operate the buttons displayed on the screen (140) of the electronic device (100) naturally, even if the user is unaware of the true name of the buttons displayed on the screen (140) of the electronic device (100). The proposed method expresses qualities and relationships of non-textual components in a textual manner.

Figure 5:
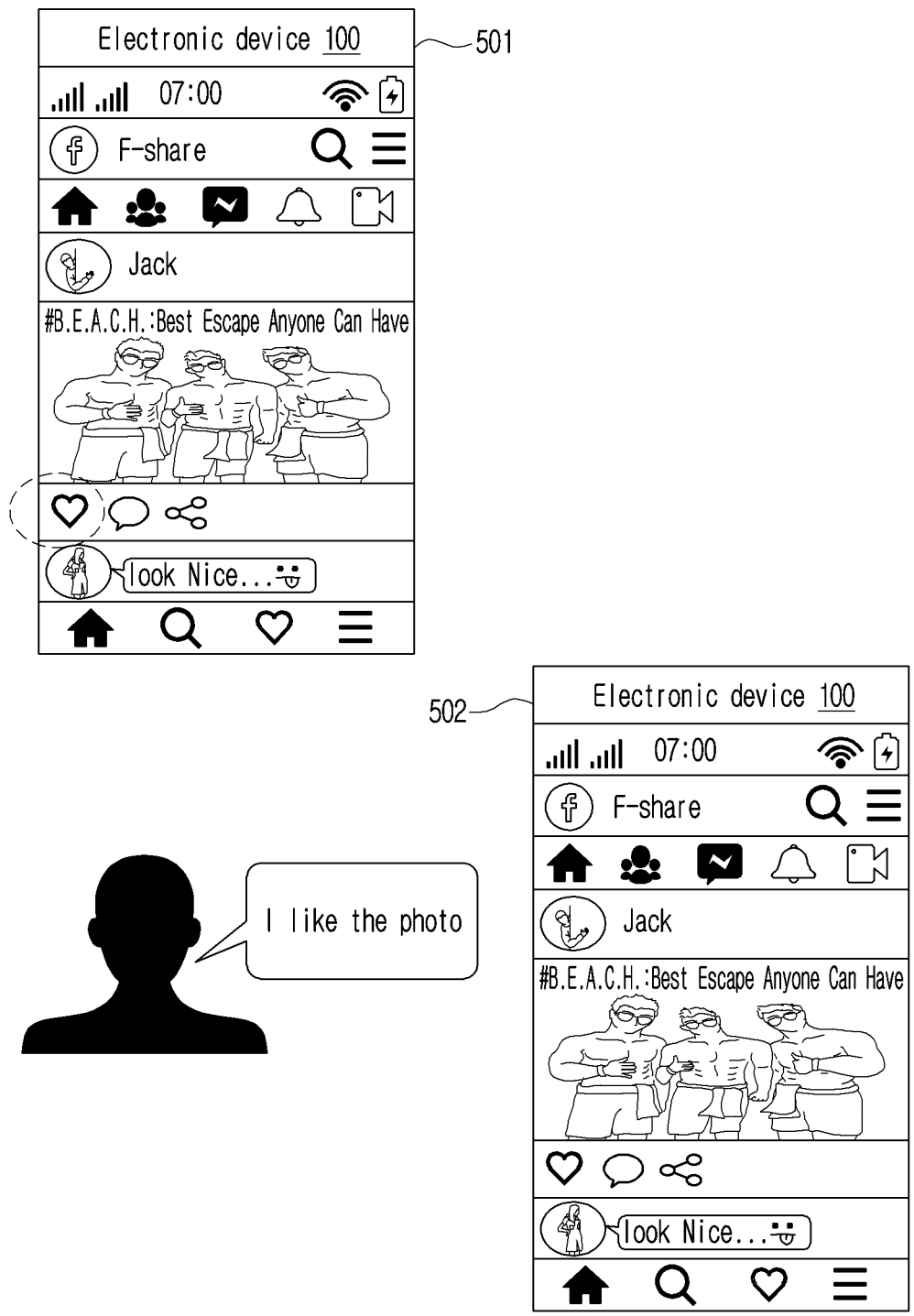
FIG. 5 illustrates an electronic device predicting NL utterances of UI element(s) for a social media application displayed on a screen of the electronic device and dynamically building models for an action simulation associated with the displayed UI element(s) according to an embodiment of the disclosure.

FIG. 5 illustrates an electronic device predicting NL utterances of UI element(s) for a social media application displayed on a screen of the electronic device and dynamically building models for an action simulation associated with the displayed UI element(s) according to an embodiment of the disclosure.

Referring to FIG. 5, at 501, consider a scenario in which the user of the electronic device (100) is browsing through the social media application (e.g., F-share) and expresses a very natural way to like a picture displayed on the screen (140).

The technical flow should be the same as discussed in FIGS. 4A and 4B: at 502, the context orchestrator (170*a*) generates the knowledge graph by using functionalizes of the relation estimator (170*aa*), the textual representer (170*ab*), the UI element capability identifier (170*ac*), and the screen sequence detector (170*ad*). Table-10 illustrates an example for notification (UI element) of the generated knowledge graph.

TABLE 10

| UI element | Knowledge graph information |
|---|---|
| Notification | Loc: (700, 10)<br>Name: Like<br>Content shape: Heart<br>Content-type: icon |

TABLE 10-continued

Type: Button
Capability: Press, Focus

The visual semantic NL estimator (170*b*) then receives the generated knowledge graph from the context orchestrator (170*a*). Furthermore, the visual semantic NL estimator (170*b*) categorizes each UI element of the received knowledge graph into the domain, the verb, the synonym, the slot, the slot type, the textually represented slot, the capability, and the relative position (140) on the screen of the electronic device (100). Furthermore, the visual semantic NL estimator (170*b*) generates the NL variations based on the categorization. Table-11 illustrates an example of NL categorization and NL variation for notification (UI element) of the visual semantic NL estimator (170*b*).

TABLE 11

| Domain | Image |
|---|---|
| Application | F-share |
| NL categorization (notification) | Relation: {Bottom to photo, Above Android} |
| | Verb: Touch, Tap, Click |
| | Slot: {Heart, Like, Love} |
| | Type: {Button, Icon, Image} |
| NL variation | Click on the heart-shaped icon |
| | I like the photo |

The action sequence planner (170*c*) then receives the generated knowledge graph from the context orchestrator (170*a*). Furthermore, the action sequence planner (170*c*) determines the action routines/action sequence graphs for single-step and multi-step commands/intents based on the capability of each UI element. Furthermore, the action sequence planner (170*c*) determines the predefined set of action routines/sequences associated with the list of capabilities found in the user interface. The action routines/sequences may be static or dynamic. The static action sequence is tabulated as it does not change in sequence. The dynamic action sequences are constructed on fly (While the user is controlling the screen, dynamic action sequences are produced in real time. It differs from the traditional approach, which required developers to explicitly design action sequence(s)) based on the screen sequence in the knowledge graph.

Furthermore, the action sequence planner (170*c*) determines action sequence identity based on the screen's actionable UI element graph stored in knowledge of the context orchestrator (170*a*). Screen's actionable element graph can be predefined input or can learn from understanding the user's screen navigation actions (both touch and voice based touch actions).

The NL synthesizer (170*d*) then receives inputs from the visual semantic NL estimator (170*b*) and the action sequence planner (170*c*). The NL synthesizer (170*d*) clusters similar NL variations, where the NL variations are determined by the visual semantic NL estimator (170*b*). The NL synthesizer (170*d*) then assigns the dynamic intent for the similar NL variations and associates the dynamic intent with the identified action and the identified action sequence, where the identified action and the identified action sequence are determined by the action sequence planner (170*c*). Table-12 illustrates an example of similar NL variations with the dynamic intent and the action sequence at the NL synthesizer (170*d*).

TABLE 12

| Dynamic intent | ID-2 |
|---|---|
| NL variations | Click on the like icon |
| | I like the photo |
| | Click on the love button |
| Action sequence | AS2 |

The dynamic language generator (170*e*) then receives input from the NL synthesizer (170*d*) and dynamically generates the NL model based on the clustered NL variation, the dynamic intent, and the action routines. Furthermore, the dynamic language generator (170*e*) stores the dynamically generated NL model in the database. The dynamic language generator (170*e*) receives the voice input (e.g., I like the photo). The dynamic language generator (170*e*) determines whether the utterance of the received voice input matches with the predicted NL utterances of one or more identified UI elements. The dynamic language generator (170*e*) automatically accesses the UI element (e.g., heart shape icon) of the social media application displayed on the screen (140) of the electronic device (100) when the utterances of the received voice input match with the predicted NL utterances of one or more identified UI elements. As a result, the user may utilize natural language to access the identified UI element(s) which enhances the user's experience.

Figure 6:
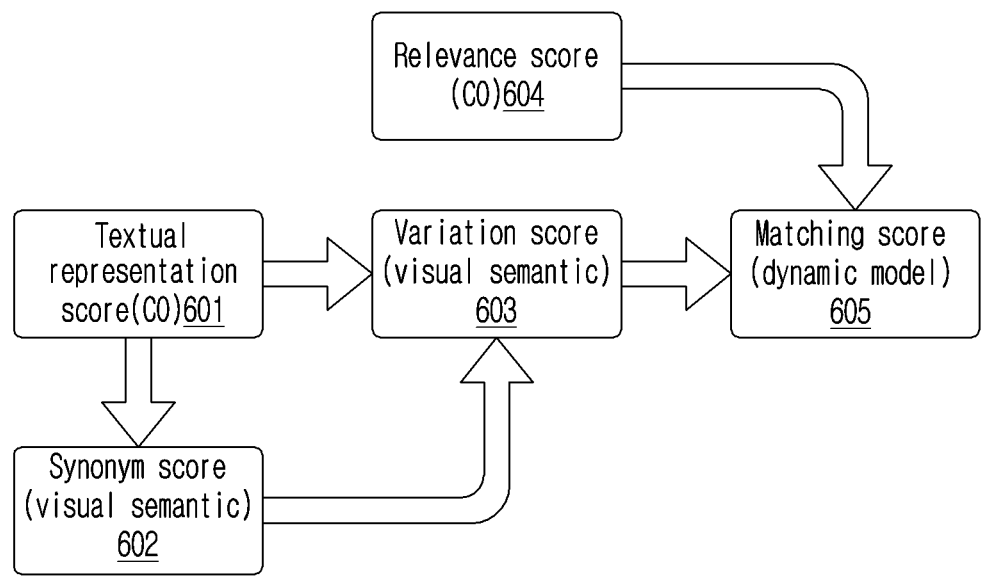
FIG. 6 illustrates a scoring mechanism for automatically accessing UI element(s) displayed on a screen of an electronic device based on a voice interaction of a user with the electronic device according to an embodiment of disclosure.

FIG. 6 illustrates a scoring mechanism for automatically accessing UI element(s) displayed on a screen of an electronic device based on a voice interaction of a user with the electronic device according to an embodiment of the disclosure.

Referring to FIG. 6, a textual representation score (601) is determined by reading the screen information displayed on the screen (140) of the electronic device (100), where the screen information is in the form of textual representation/textual UI elements (s). Furthermore, the context orchestrator (170*a*) includes the textual representation score (601). During the extraction of synonyms for verbs and nouns from the textual representation/textual UI element(s), a synonym score (602) is assigned. As a distance between the synonyms and the primary representation (textual representation) grows, the synonym score (602) falls. The visual semantic NL estimator (170*b*) includes the synonym score (602) and receives input from the textual representation score (601). A variance score (603) is determined by associating NL variations generated which can be used to make weighted training into the dynamic language generator (170*e*). A relevance score (604) is determined by comparing nearby element information with reference objects mentioned in the utterance of the received voice input. A matching score (605) is a final score which matches the utterance of the received voice input against the dynamic language generator (170*e*) and combines it with the relevance score (604).

In an embodiment of the disclosure, the interaction engine (170) extracts best matching content from the screen information. In case of multiple matches, use the score to tune the disambiguation representation.

Figure 7:
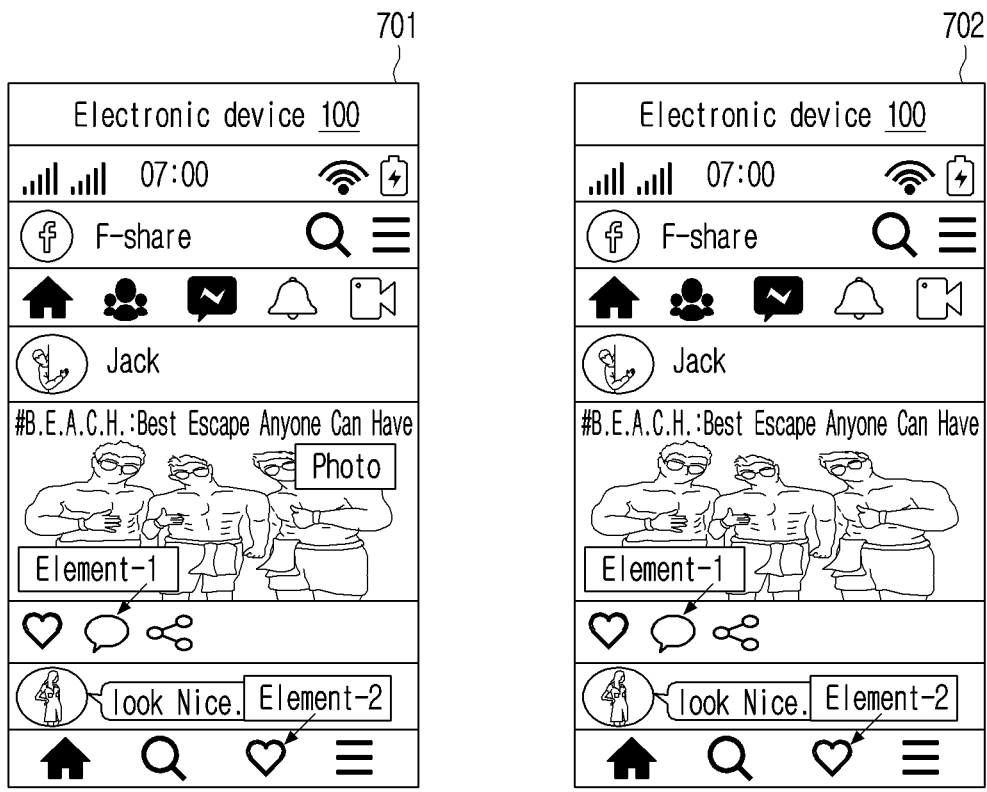
FIG. 7 illustrates an electronic device using a scoring mechanism for predicting NL utterances of UI element(s) for a social media application displayed on a screen of the electronic device and dynamically building models for an action simulation associated with the displayed UI element(s) according to an embodiment of the disclosure.

FIG. 7 illustrates an electronic device using a scoring mechanism for predicting NL utterances of UI element(s) for a social media application displayed on a screen of the electronic device and dynamically building models for an action simulation associated with the displayed UI element(s) according to an embodiment of the disclosure.

Referring to FIG. 7, at 701, consider a scenario in which the user of the electronic device (100) is browsing through the social media application (e.g., F-share) and expresses a very natural way to like a picture displayed on the screen (140). Different scores are retrieved by the interaction engine (170) in this scenario, and the interaction engine (170) filters the best match among the screen matches discovered. On the screen (140), there are two heart-shaped icons labeled element 1 and element 2. Which one is best for the user is discussed in this scenario.

The context orchestrator (170a) generates the knowledge graph by using functionalizes of the relation estimator (170aa), the textual representer (170ab), the UI element capability identifier (170ac), and the screen sequence detector (170ad). Table-13 illustrates an example for notification (UI element) of the generated knowledge graph.

TABLE 13

| UI element | Knowledge graph information |
|---|---|
| Notification | Loc: (700, 10) |
| | Name: Like |
| | Content shape: Heart (0.98) |
| | "textual representation score (601)" |
| | Content-type: icon |
| | Type: Button |
| | Capability: Press, Focus |

The visual semantic NL estimator (170b) then receives the generated knowledge graph from the context orchestrator (170a). Furthermore, the visual semantic NL estimator (170b) categorizes each UI element of the received knowledge graph into the domain, the verb, the synonym, the slot, the slot type, the textually represented slot, the capability, and the relative position (140) on the screen of the electronic device (100). Furthermore, the visual semantic NL estimator (170b) generates the NL variations based on the categorization. Table-14 illustrates an example of NL categorization and NL variation for notification (UI element) of the visual semantic NL estimator (170b).

TABLE 14

| Domain | Image |
|---|---|
| Application | F-share |
| NL categorization (notification) | Relation: {Bottom to photo, Above Android} |
| | Verb: Touch (0.7), Tap (0.9), Click (1.0) |
| | "synonym score (602)" |
| | Slot: {Heart (1.0), Like (0.8), Love (0.8)} |
| | "synonym score (602)" |
| | Type: {Button, Icon, Image} |
| NL variation | Click on the heart-shaped icon (0.98) |
| | "variance score (603)" |
| | I like the photo (0.8) |
| | "variance score (603)" |

The action sequence planner (170c) then receives the generated knowledge graph from the context orchestrator (170a). Furthermore, the action sequence planner (170c) determines the action routines/action sequence graphs for single-step and multi-step commands/intents based on the capability of each UI element. Furthermore, the action sequence planner (170c) determines the predefined set of action routines/sequences associated with the list of capabilities found in the user interface. The action routines/sequences may be static or dynamic. The static action sequence is tabulated as it does not change in sequence. The dynamic action sequences are constructed on fly based on the screen sequence in the knowledge graph.

The NL synthesizer (170d) then receives inputs from the visual semantic NL estimator (170b) and the action sequence planner (170c). The NL synthesizer (170d) clusters similar NL variations, where the NL variations are determined by the visual semantic NL estimator (170b). The NL synthesizer (170d) then assigns the dynamic intent for the similar NL variations and associates the dynamic intent with the identified action and the identified action sequence, where the identified action and the identified action sequence are determined by the action sequence planner (170c). Table-15 illustrates an example of similar NL variations with the dynamic intent and the action sequence at the NL synthesizer (170d).

TABLE 15

| Dynamic intent | ID-2 |
|---|---|
| NL variations | Click on the like icon |
| | I like the photo |
| | Click on the love button |
| Action sequence | AS2 |

The dynamic language generator (170e) then receives input from the NL synthesizer (170d) and dynamically generates the NL model based on the clustered NL variation, the dynamic intent, and the action routines. Furthermore, the dynamic language generator (170e) stores the dynamically generated NL model in the database. The dynamic language generator (170e) receives the voice input (e.g., I like photo). The dynamic language generator (170e) determines whether the utterance of the received voice input matches with the predicted NL utterances of one or more identified UI elements. Table-16 illustrates an example of candidate estimation at the dynamic language generator (170e).

TABLE 16

| Candidate estimation | |
|---|---|
| Element-1 | Heart Loc. (700, 10) (0.8) |
| Element-2 | Heart Loc. (980, 1200) (0.8) |

The dynamic language generator (170e) then determines relevance score (604) by comparing nearby element information with reference objects mentioned in the utterance of the received voice input (i.e., I like the photo (0.9)).

The dynamic language generator (170e) then determines the matching score (605) as a final score. Table-17 illustrates an example of the matching score (605) at the dynamic language generator (170e).

TABLE 17

| Final output | |
|---|---|
| Element-1 | Heart Loc. (700, 10) (0.9) (winner) |
| Element-2 | Heart Loc. (980, 1200) (0.8) |

The dynamic language generator (170e) automatically accesses the UI element (e.g., heart shape icon (element-1)) of the social media application displayed on the screen (140) of the electronic device (100) when the utterances of the received voice input match with the predicted NL utterances of one or more identified UI elements. In this scenario, the user mentions "like" and "photo" the interaction engine (170) was to operate the element-1 heart-shaped icon based on Table-17.

At 702, consider a scenario in which the dynamic language generator (170e) receives the voice input (e.g., click heart shape icon). The dynamic language generator (170e) determines whether the utterance of the received voice input matches with the predicted NL utterances of one or more identified UI elements. Table-18 illustrates an example of candidate estimation at the dynamic language generator (170e).

TABLE 18

Candidate estimation

| | |
|---|---|
| Element-1 | Heart Loc. (700, 10) (0.8) |
| Element-2 | Heart Loc. (980, 1200) (0.8) |

The dynamic language generator (170e) then determines relevance score (604) by comparing nearby element information with reference objects mentioned in the utterance of the received voice input (i.e., a click heart shape icon (0)). The dynamic language generator (170e) then determines the matching score (605) as a final score. Table-19 illustrates an example of the matching score (605) at the dynamic language generator (170e).

TABLE 19

Final output

| | |
|---|---|
| Element-1 | Heart Loc. (700, 10) (0.8) |
| Element-2 | Heart Loc. (980, 1200) (0.8) |

This scenario multiple matches with same score will need to initiate disambiguation flow to the user for selecting one of them. Since the utterance has the indication of target element without any supportive information, the relevance score (604) is nil. Hence this process will present disambiguation user interface.

Figure 8A:
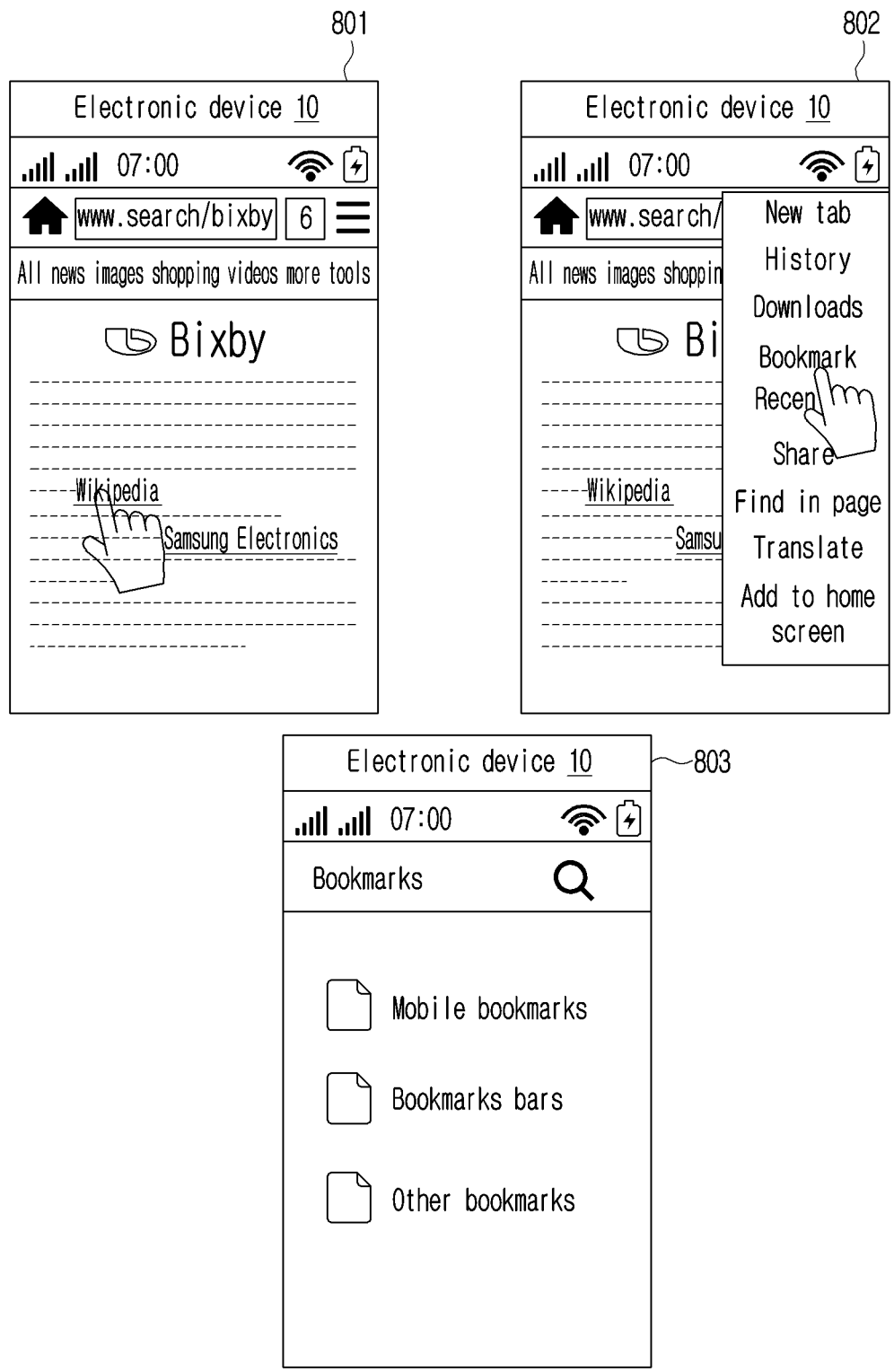
FIGS. 8A and 8B illustrate a comparison between a method of the related art with a limited set of control and search instructions, and a proposed method for predicting NL utterances of UI element(s) for multi-step intent according to various embodiments of the disclosure.
Figure 8B:
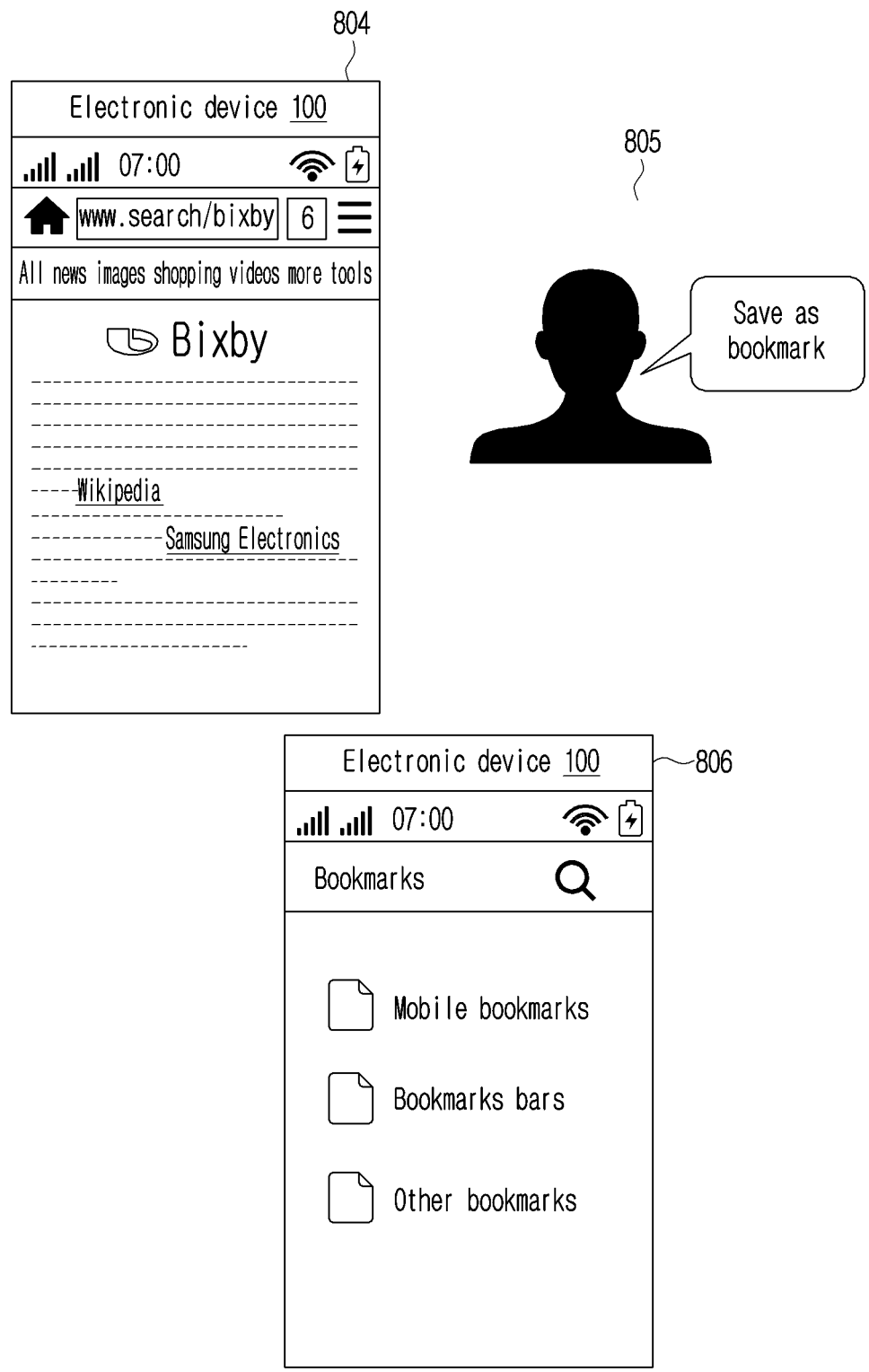

FIGS. 8A and 8B illustrate a comparison between methods of the related art with a limited set of control and search instructions, and a proposed method for predicting NL utterances of UI element(s) for multi-step intent according to various embodiments of the disclosure.

Referring to FIGS. 8A and 8B, at 801-803, represents the existing methods, consider a scenario in which the user wants to save/bookmark the page of a browsing application displayed on the screen of the existing electronic device (10). In this scenario, user have manually do step by step procedure as the existing method do not access the sub functionality or sub-page of this browsing application that are not displayed on the screen of the electronic device (10). The user only access the UI element(s) that are displayed on the screen of the electronic device (10) using the existing methods. At 804-806, represents the method (proposed method) in which the user can access sub functionality or sub-page of displayed application/UI element(s) that are not displayed on the screen of the electronic device by utilizing natural language (i.e., save as bookmark as voice input to the electronic device (100)) which enhances the user's experience.

Figure 9A:
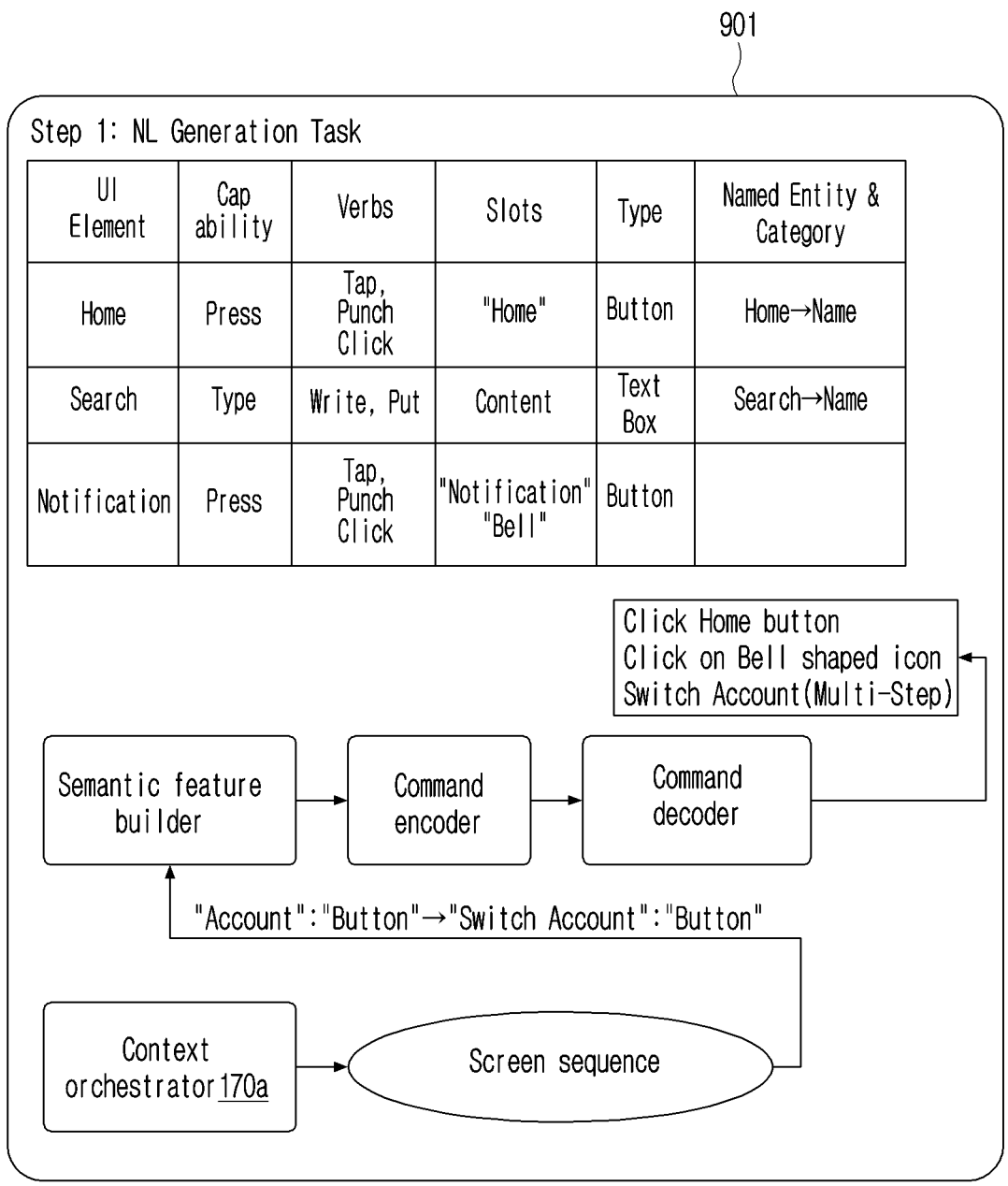
FIGS. 9A, 9B, and 9C illustrate functionalities associated with an NL synthesizer of an electronic device for automatically accessing UI element(s) displayed on a screen of the electronic device according to various embodiments of the disclosure.
Figure 9B:
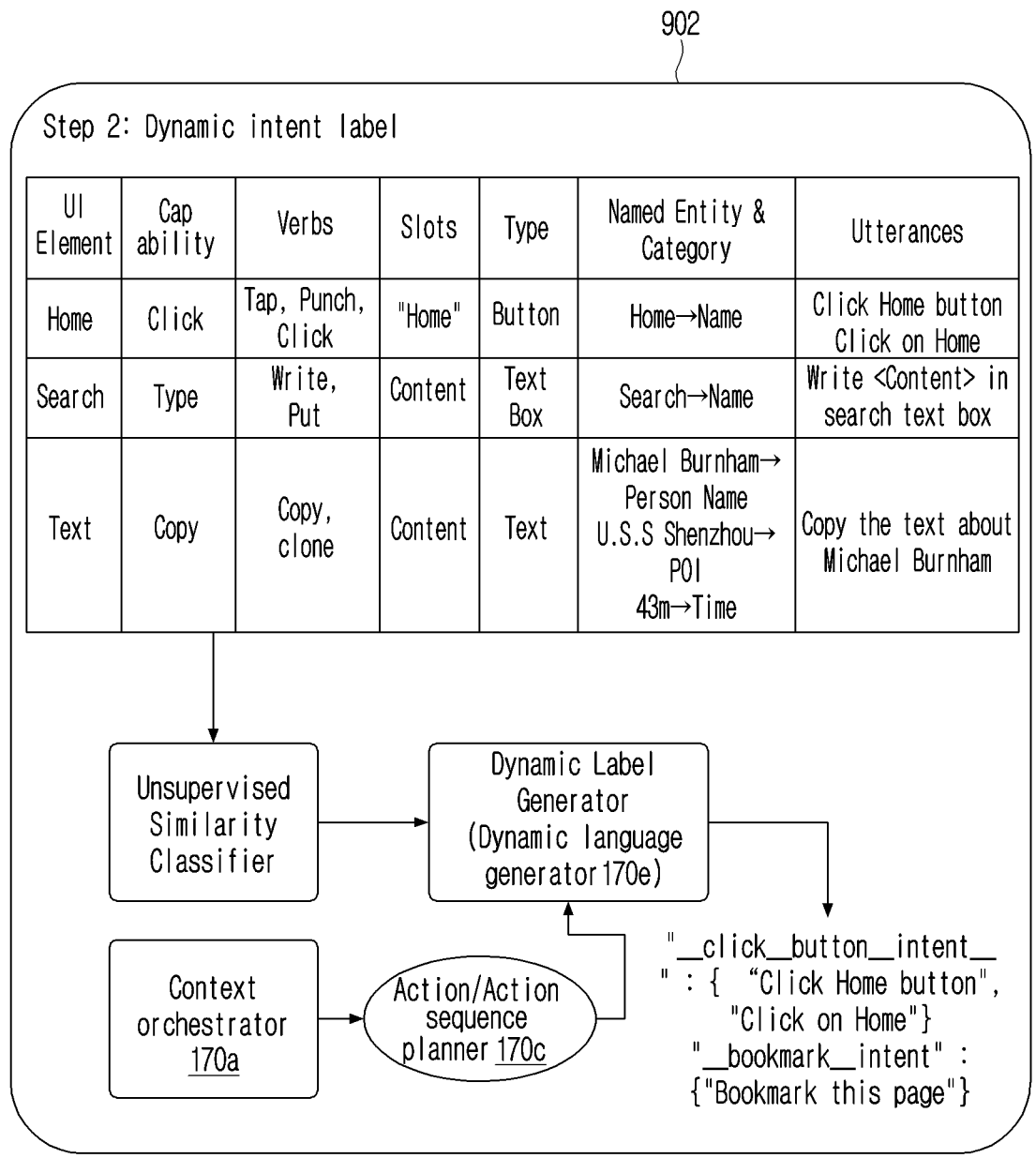
Figure 9C:
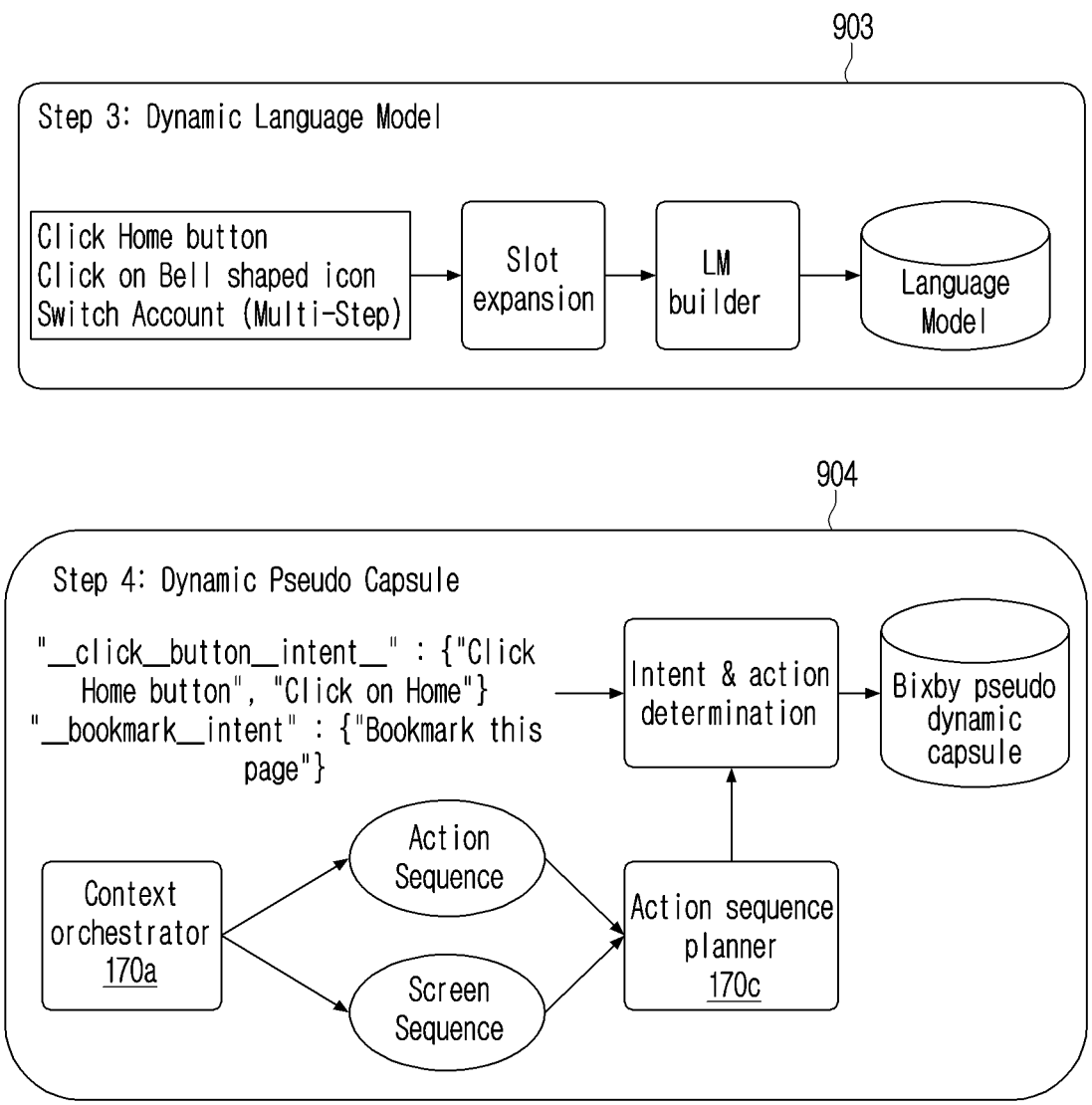

FIGS. 9A, 9B, and 9C illustrate functionalities associated with an NL synthesizer of an electronic device for automatically accessing UI element(s) displayed on a screen of the electronic device according to various embodiments of the disclosure.

Referring to FIGS. 9A, 9B, and 9C, the NL synthesizer (170d) performs various functionalities, such as an NL generation task (901), a dynamic intent label (902), a dynamic language model (903), and a dynamic pseudo capsule (904). The NL generation task (901) contains following modules, a semantic feature builder accumulates all the screen information and corresponding grammar tags. A command encoder uses the grammar tags and generates variations with the slot place holders. A command decoder uses the real-time screen information, i.e., tag values and substitutes on the output variations of command encoder. The command decoder generates the final utterance variations. The dynamic intent label (902) has the following modules, an unsupervised similarity classifier is a module which identifies and categorizes similar utterances into buckets. A dynamic label generator assigns a dynamic id to group of similar utterances in a bucket. The dynamic language model (903) contains the following modules, a slot expansion module replaces the variations with actual slot values to generate a complete utterance. An lm builder uses the generated variations and builds a Language Model in real-time. At dynamic pseudo capsule (904) an intent and action determination module takes input from a dynamic intent label (902) and action sequence planner (170c) and stores prediction based on the received inputs into the memory (110) (e.g., Bixby pseudo dynamic capsule).

In an embodiment of the disclosure, the interaction engine (170) supports generating single-action or multi-action-based single/multi-intent utterances. The interaction engine (170) determines named entities along with domain and category information from the screen-text and uses these information's in generating open domain NL utterances. Generated NL utterances are categorically trained into a dynamic LM which will further assist in improving audio speech recognition (ASR) and NLEPD accuracy of an existing voice assistance (VA) (e.g., Bixby in this case). Further, the interaction engine (170) plugging in the NL Intent and action pairs into the VA NLU system for prediction of intent, action planning, and execution dynamically. Contextual information's generated in architecture, such as NL, NL Categorical Intent, and Dynamic LM are refreshed on every change in the screen (140). Multi-modal information fusion to disambiguate screen content selection through voice and associating and differentiating between names for similar type of control across different applications.

The interaction engine (170) categorizing NL into intents and associating the generated NL with the Action routines, eliminate the need of explicitly training user's voice interaction for any apps. Further, the interaction engine (170) associating screen action sequence helps in establishing uni/multi-intent NL for single-action or multi-action operation. By using the generated categorical NL, a dynamic Language Model is generated to assist ASR in more adequate Speech to Text (STT) recognition, assist natural language based end point detection (NLEPD) in determining the EPD for untrained utterances.

Further, the interaction engine (170) uses improved named entity recognition in Bixby ASR module and contextually accurate EPD detection using the dynamically generated. Further, the interaction engine (170) uses the dynamic NL Capsule development from the screen context information and hence no explicit NL training is needed. Further, the interaction engine (170) disambiguates the screen control contents using Multi-Modal fusion with the screen context information and dynamic action sequence planning using the screen transition sequence.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, the method comprising:
   identifying, by the electronic device, at least one user interface (UI) element displayed on a screen of the electronic device using at least one of screen reading application programming interface (API), optical character recognition (OCR), or image classification;
   identifying, by the electronic device, at least one characteristic of the identified at least one UI element;
   predicting, by the electronic device, a natural language utterance based on the at least one characteristic of the identified at least one UI element;
   generating, by the electronic device, a database including the predicted natural language utterance corresponding to the identified at least one UI element;
   based on receiving a voice input, identifying, by the electronic device, whether an utterance of the received voice input matches the natural language utterance included in the generated database; and
   based on identifying that the utterance of the voice input matches the natural language utterance, automatically accessing, by the electronic device, the at least one UI element,
   wherein the at least one characteristic of the identified at least one UI element comprises:
      at least one of positions of respective UI elements, relative positions of the respective UI elements for other UI elements, functions of the respective UI elements, capabilities of the respective UI elements, types of the respective UI elements, or appearances of the respective UI elements,
   wherein the at least one UI element comprises a non-textual UI element,
   wherein the predicting of the natural language utterance comprises determining a textual representation of the non-textual UI element and a viewable relative position of the non-textual UI element among viewable positions of the other UI elements,
   wherein the generating of the database comprises:
      identifying similarities between respective UI elements based on positions of the respective UI elements, and a similarity between at least one of relative positions of the respective UI elements, functions of the respective UI elements, capabilities of the respective UI elements, or shapes of the respective UI elements;
      acquiring a knowledge graph by clustering the respective UI elements based on the identified similarities; and
      storing the knowledge graph in the database, and
   wherein the method further comprising:
      performing a semantic translation on the knowledge graph to acquire natural language variations for at least one of a single-step intent or a multi-step intent;
      identifying at least one action and at least one action sequence for at least one of the single-step intent or the multi-step intent using the knowledge graph; and
      dynamically generating a natural language model for predicting a natural utterance of the identified UI element by mapping the acquired natural language variations with the identified at least one action and the identified at least one action sequence.

2. The method of claim 1, wherein the at least one UI element comprises:
   at least one of an actionable UI element, a non-actionable UI element, a textual UI element, or the non-textual UI element; and
   at least one of relative positions of respective UI elements, functions of the respective UI elements, capabilities of the respective UI elements, types of the respective UI elements, or shapes of the respective UI elements.

3. The method of claim 1, wherein the identifying of whether the utterance of the voice input matches the natural language utterance comprises:
   firstly comparing the utterance of the voice input with a natural language utterance corresponding to a textual UI element included in the database;
   according to a result of the first comparison, secondly comparing the utterance of the voice input with a natural language utterance corresponding to a synonym of the textual UI element included in the database;
   according to a result of the second comparison, thirdly comparing the utterance of the voice input with a natural language utterance corresponding to a shape of the non-textual UI element included in the database; and
   identifying whether the utterance of the voice input matches the natural language utterance based on at least one of the result of the first comparison, the result of the second comparison, or a result of the third comparison.

4. The method of claim 3, wherein the identifying of whether the utterance of the voice input matches the natural language utterance comprises:
   acquiring a learning result of a neural network model stored in the database; and
   identifying whether the utterance of the voice input matches the natural language utterance based on at least one of the result of the first comparison, the result of the second comparison, or the result of the third comparison and the learning result.

5. The method of claim 1,
   wherein the identifying of whether the utterance of the voice input matches the natural language utterance comprises:
      acquiring a matching score for at least one UI element included in the screen, and
   wherein the automatically accessing the at least one UI element comprises:
      acquiring a matching score for at least one UI element included in the screen,
      based on matching scores of a plurality of respective UI elements being greater than or equal to a first threshold numerical value, and based on differences of the matching scores of the plurality of respective UI elements being within a second threshold numerical value, providing a guide UI for selecting any one of the plurality of UI elements, and
      based on a matching score of one UI element being greater than or equal to the first threshold numerical value, and based on a difference from the matching scores of the other UI elements being greater than the second threshold numerical value, executing the one UI element, or providing a guide UI requesting a user's confirmation on execution for the one UI element.

6. The method of claim 5, wherein the automatically accessing of the at least one UI element comprises:
based on matching scores of all UI elements included in the screen being smaller than the first threshold numerical value, providing at least one of a guide GUI notifying information or a guide UI including at least one recommended UI element.

7. The method of claim 1, wherein the generating of the database comprises:
mapping pre-defined information corresponding to the respective UI elements and the capabilities of the respective UI elements and acquiring a knowledge graph; and
storing the acquired knowledge graph in the database.

8. The method of claim 1, wherein the generating of the database comprises:
determining a pre-defined screen sequence transitioned through an actionable UI element in the screen and acquiring a knowledge graph; and
storing the acquired knowledge graph in the database.

9. The method of claim 1, wherein the performing of the semantic translation comprises:
categorizing the respective UI elements of the knowledge graph into at least one of domains, verbs, synonyms, slots, slot types, textually represented slots, capabilities, or the relative positions on the screen; and
acquiring the natural language variations based on the categorization.

10. The method of claim 1,
wherein the identifying of the at least one action and the at least one action sequence comprises:
determining a pre-defined table set including information related to the types of the UI elements included in the screen and capabilities corresponding thereto, verbs related to the capabilities, capabilities for action information, element sequence graphs actionable on the screen and corresponding action sequences, and pre-defined actions and action sequences, and
determining action routines based on the capabilities of the respective UI elements, and
wherein unique identities are assigned to the pre-defined actions and action sequences.

11. The method of claim 10, wherein the dynamically generating of the natural language model comprises:
clustering similar natural language variations;
assigning dynamic intents for the similar natural language variations;
associating the identified at least one action and the identified at least one action sequence with the dynamic intents;
dynamically generating the natural language model based on the clustered similar natural language variations, the dynamic intents, and the action routines; and
storing the dynamically generated natural language model in the database.

12. An electronic device comprising:
a screen;
memory storing one or more computer programs; and
one or more processors communicatively connected to the screen and the memory,
wherein the one or more computer programs include computer-executable instructions that, when executed by the one or more processors, cause the electronic device to:
identify at least one user interface (UI) element displayed on the screen using at least one of screen reading application programming interface (API), optical character recognition (OCR), or image classification,
identify at least one characteristic of the identified at least one UI element,
predict a natural language utterance based on the at least one characteristic of the identified at least one UI element,
generate a database including the predicted natural language utterance corresponding to the at least one identified UI element,
based on receiving a voice input, identify whether an utterance of the received voice input matches the natural language utterance included in the generated database, and
based on identifying that the utterance of the voice input matches the natural language utterance, automatically access the at least one UI element,
wherein the at least one characteristic of the at least one identified UI element comprises:
at least one of positions of respective UI elements, relative positions of the respective UI elements for other UI elements, functions of the respective UI elements, capabilities of the respective UI elements, types of the respective UI elements, or appearances of the respective UI elements,
wherein the at least one UI element comprises a non-textual UI element,
wherein the one or more computer programs include computer-executable instructions that, when executed by the one or more processors, cause the electronic device to determine a textual representation of the non-textual UI element and a viewable relative position of the non-textual UI element among viewable positions of the other UI elements, and
wherein the one or more computer programs further include computer-executable instructions that, when executed by the one or more processors, cause the electronic device to:
identify similarities between respective UI elements based on positions of the respective UI elements, and a similarity between at least one of relative positions of the respective UI elements, functions of the respective UI elements, capabilities of the respective UI elements, or shapes of the respective UI elements;
acquire a knowledge graph by clustering the respective UI elements based on the identified similarities;
store the knowledge graph in the database;
perform a semantic translation on the knowledge graph to acquire natural language variations for at least one of a single-step intent or a multi-step intent;
identify at least one action and at least one action sequence for at least one of the single-step intent or the multi-step intent using the knowledge graph; and
dynamically generate a natural language model for predicting a natural utterance of the identified UI element by mapping the acquired natural language variations with the identified at least one action and the identified at least one action sequence.

13. The electronic device of claim 12, wherein the at least one UI element comprises:
- at least one of an actionable UI element, a non-actionable UI element, a textual UI element, or the non-textual UI element; and
- at least one of relative positions of respective UI elements, functions of the respective UI elements, capabilities of the respective UI elements, types of the respective UI elements, or shapes of the respective UI elements.

14. The electronic device of claim 12, wherein the one or more computer programs further include computer-executable instructions that, when executed by the one or more processors, cause the electronic device to:
- firstly compare the utterance of the voice input with a natural language utterance corresponding to a textual UI element included in the database;
- according to a result of the first comparison, secondly compare the utterance of the voice input with a natural language utterance corresponding to a synonym of the textual UI element included in the database;
- according to a result of the second comparison, thirdly compare the utterance of the voice input with a natural language utterance corresponding to a shape of the non-textual UI element included in the database; and
- identify whether the utterance of the voice input matches the natural language utterance based on at least one of the result of the first comparison, the result of the second comparison, or a result of the third comparison.

15. The electronic device of claim 14, wherein the one or more computer programs further include computer-executable instructions that, when executed by the one or more processors, cause the electronic device to:
- acquire a learning result of a neural network model stored in the database; and
- identify whether the utterance of the voice input matches the natural language utterance based on at least one of the result of the first comparison, the result of the second comparison, or the result of the third comparison and the learning result.

16. The electronic device of claim 12,
wherein the wherein the one or more computer programs further include computer-executable instructions that, when executed by the one or more processors, cause the electronic device to:
- acquire a matching score for at least one UI element included in the screen, and wherein the automatically accessing the at least one UI element comprises:
- acquire a matching score for at least one UI element included in the screen,
- based on matching scores of a plurality of respective UI elements being greater than or equal to a first threshold numerical value, and based on differences of the matching scores of the plurality of respective UI elements being within a second threshold numerical value, provide a guide UI for selecting any one of the plurality of UI elements, and
- based on a matching score of one UI element being greater than or equal to the first threshold numerical value, and based on a difference from the matching scores of the other UI elements being greater than the second threshold numerical value, execute the one UI element, or providing a guide UI requesting a user's confirmation on execution for the one UI element.

17. The electronic device of claim 16, wherein the one or more computer programs further include computer-executable instructions that, when executed by the one or more processors, cause the electronic device to:
- based on matching scores of all UI elements included in the screen being smaller than the first threshold numerical value, provide at least one of a guide GUI notifying information or a guide UI including at least one recommended UI element.

\* \* \* \* \*